United States Patent
Howerton et al.

(10) Patent No.: US 8,326,791 B2
(45) Date of Patent: Dec. 4, 2012

(54) PRIORITIZING BRIDGES TO REPAIR BASED ON RISK

(75) Inventors: Timothy Faye Howerton, Overland Park, KS (US); Bala Sivakumar, Franklin Lakes, NJ (US); Glen A. Herman, Olathe, KS (US)

(73) Assignee: HNTB Holdings Ltd, Kansas City, MO (US)

( * ) Notice: Subject to any disclaimer, the term of this patent is extended or adjusted under 35 U.S.C. 154(b) by 690 days.

(21) Appl. No.: 12/570,957

(22) Filed: Sep. 30, 2009

(65) Prior Publication Data

US 2010/0241609 A1   Sep. 23, 2010

Related U.S. Application Data

(60) Provisional application No. 61/160,962, filed on Mar. 17, 2009.

(51) Int. Cl.
*G06N 5/00*   (2006.01)

(52) U.S. Cl. ............................................ 706/52; 706/45

(58) Field of Classification Search .................... 706/52, 706/45

See application file for complete search history.

(56) References Cited

OTHER PUBLICATIONS

Aker Offshore Partner A.S, Target levels for reliability-based assessment of offshore structures during design and operation, Health & Safety Executive, Norway, 2002, pp. 1-50.*

Marsadek, et al., Assessment and classification of line overload risk in power systems considering different types of severity functions, WSEAS Transactions on Power Systems, Issue 3, vol. 5, Jul. 2010, pp. 1-10.*

Paul D. Thompson, Consultant, and Richard W. Shepard, Supervising Bridge Engineer, Office of Structures Maintenance, California Department of Transportation, "AASSHTO Commonly-Recognized Bridge Elements—Successful Applications and Lessons Learned," Prepared for the National Workshop on Commonly Recognized Measures for Maintenance, Jun. 2000, 13 pages.

William A. Weseman, Director Office of Engineering, Prepared by: Office of Engineering, Bridge Division, Bridge Management Branch, Washington, DC 20590, "Recording and Coding Guide for the Structure Inventory and Appraisal of the Nation's Bridges," Dec. 1995, 127 pages.

\* cited by examiner

*Primary Examiner* — Wilbert L Starks
(74) *Attorney, Agent, or Firm* — Shook, Hardy & Bacon L.L.P.

(57) ABSTRACT

Embodiments of the invention are generally directed toward methods, systems, and computer-readable media for prioritizing bridge repairs using a risk-based analysis. An overall risk factor is generated for each of a plurality of bridges. The overall risk factor represents the probability of failure times the consequence on failure for the bridge. Repairs to bridges that pose a greater risk may be prioritized before repairs made to bridges posing a lower risk.

20 Claims, 21 Drawing Sheets

FIG. 9.

| Element | Percent by condition state | | | | | Worst | 2nd Worst | WF | Deficient | Category Demerit | Category Weight | Total Demerit |
|---|---|---|---|---|---|---|---|---|---|---|---|---|
| | 1 | 2 | 3 | 4 | 5 | | | | | | | |
| Superstructure elements | | | | | | | | | | | | |
| 107-Painted steel open girder | 41 | 20 | 20 | 10 | 9 | 9 | 10 | 0.75 | 16.5 | | | |
| Average percent in deficient state: | | | | | | | | | 16.5 | | | |
| Enter a 2 if fracture-critical, 1 otherwise: | | | | | | | | | 1 | | | |
| Total: | | | | | | | | | 16.5 | | | |
| Substructure elements | | | | | | | | | | | | |
| 210-Concrete pier wall | 80 | 0 | 0 | 20 | | 20 | 0 | 0.67 | 20.0 | | | |
| 215-Concrete abutment | 100 | 0 | 0 | 0 | | 0 | 0 | 0.67 | 0.0 | | | |
| 226-Conc submerged pile | 50 | 25 | 25 | | | 25 | 25 | 0.67 | 41.8 | | | |
| Average percent in deficient state: | | | | | | | | | 20.6 | | | |
| Larger of superstructure or substructure, capped at 25 percent: | | | | | | | | | 20.6 | ×2.5 = | | 51.5 |
| Deck elements | | | | | | | | | | | | |
| 13-Conc deck/AC overlay | 0 | 0 | 0 | 0 | 100 | 25 | | | | | | |
| Average percent in worst state: | | | | | | 25.00 | | | | | | |
| Average percent in deficient state, capped at 25 percent: | | | | | | | | | 25.0 | ×1 = | | 25.0 |
| Other elements | | | | | | | | | | | | |
| 311-Moveable bearing | 80 | 20 | 0 | | | 0 | 20 | 0.50 | 10.0 | | | |
| Average percent in deficient state: | | | | | | | | | 10.00 | | | |
| Average percent in deficient state, capped at 25 percent: | | | | | | | | | 10.0 | ×1 = | | 10.0 |
| Special elements | | | | | | | | | | | | |
| 359-Soffit cracking | 0 | 0 | 0 | 0 | 10 | 10 | | | | | | |
| Special element deficiency: | | | | | | | | | 10.00 | | | |
| Special element deficiency, capped at 25 percent: | | | | | | | | | 10.0 | ×1 = | | 10.0 |
| | | | | | | | | | | | Bridge Total: | 96.5 |
| Condition subindex (subtract bridge total from 100, then divide by 100, floor at zero): | | | | | | | | | | | | 0.035 |

PRIORITIZING BRIDGES TO REPAIR BASED ON RISK

CROSS-REFERENCE TO RELATED APPLICATION

This application claims the benefit of U.S. Provisional Application No. 61/160,962, filed Mar. 17, 2009, which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

Embodiments of the present invention provide an automated method for determining which bridges within a group of bridges should be repaired first based on risk factors calculated for the bridges. Embodiments of the present invention calculate an overall risk factor (variously referred to simply as "risk factor" herein for readability in some places) for bridges using information commonly available in federal and state bridge databases. For example, bridge design details, design loads, and route information can be taken from the National Bridge Inventory ("NBI") database. Bridge condition information can be taken from state bridge databases, often maintained by a state department of transportation, that record the result of bridge inspections. Thus, the overall risk factor can be calculated for a large number of bridges using existing data. The overall risk factor may be defined as the probability of failure multiplied by the consequence of failure. Prioritizing bridge repairs based on bridges' risk factors helps ensure that the most urgently needed repairs are made first.

BRIEF DESCRIPTION OF THE SEVERAL VIEWS OF THE DRAWING

Illustrative embodiments of the present invention are described in detail below with reference to the attached drawing figures, and wherein:

FIG. 9 shows a sample bridge-condition risk factor calculation, in accordance with an embodiment of the present invention.

DETAILED DESCRIPTION

Figure 1:
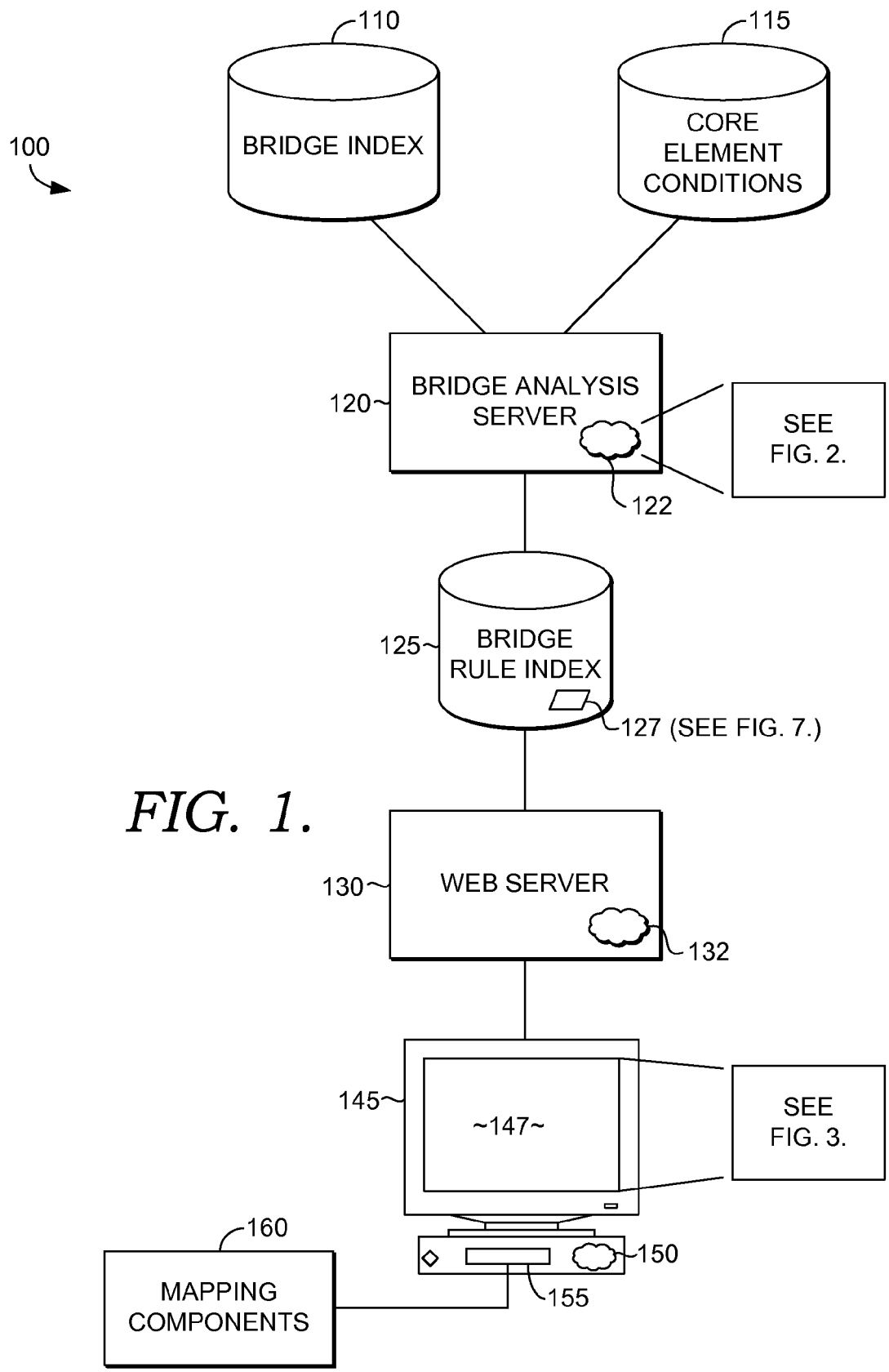
FIG. 1 shows a method for calculating an overall risk factor for a plurality of bridges, in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide an automated method for determining which bridges within a group of bridges should be repaired first based on risk factors calculated for the bridges. Embodiments of the present invention calculate an overall risk factor for bridges using information commonly available in federal and state bridge databases. For example, bridge design details, design loads, and route information can be taken from the National Bridge Inventory ("NBI") database. Bridge condition information can be taken from state bridge databases, often maintained by a state department of transportation, that record the result of bridge inspections. Thus, the overall risk factor can be calculated for a large number of bridges using existing data.

Embodiments of the present invention calculate the overall risk factor for a bridge as the probability the bridge will fail multiplied by the consequence of failure. As will be explained in more detail subsequently, the probability the bridge will fail is measured by a probability-of-failure factor that is a combination of a live-load-risk factor and a bridge-condition risk factor. In one embodiment, these two factors are given equal weight when calculating the probability-of-failure factor. The live-load-failure factor is based on a comparison of a design load, posted load, or legal load with the current traffic, and especially truck traffic, carried by the bridge. The bridge-condition risk factor is based on the percentage of bridge elements that are in a condition that is likely to increase the probability of failure. Superstructure and substructure elements may be given more weight when calculating the bridge-condition risk factor. The consequence-of-failure factor may be calculated based on variables such as the cost of bridge replacement, detour length, and importance of the route of which the bridge is a part. The calculation of the overall risk factor and its constituent components will be explained in more detail subsequently.

Turning now to FIG. 1, a block diagram is illustrated that shows an exemplary computing system architecture 100 suitable for performing a bridge-risk analysis. It will be understood and appreciated by those of ordinary skill in the art that the computing system architecture 100 shown in FIG. 1 is merely an example of one suitable computing system and is not intended to suggest any limitation as to the scope of the use or functionality of embodiments of the invention. Neither should the computing system architecture 100 be interpreted as having any dependency or requirement related to any single component/module or combination of components/modules illustrated therein.

Computing system architecture 100 includes bridge-characteristic data store 110, bridge-condition data store 115, bridge-analysis server 120, risk-factor application 122, risk-factor data store 125, web server 130, bridge-data-retrieval application 132, client device 145, display application 150, map API 155, and mapping component 160. Computing system architecture 100 may reside on a single computing device or a distributed computing environment that includes multiple computing devices (e.g., servers, clients) coupled with one another via one or more networks. Such networks may include, without limitation, one or more local area networks (LANs) and/or one or more wide area networks (WANs). Such network environments are commonplace in offices, enterprise-wide computer networks, intranets, and the Internet. Accordingly, the network, or combination of networks, is not further described herein.

The bridge-characteristic data store 110 includes a computer-readable media suitable for storing information. The bridge-characteristic data store 110 includes information describing the physical characteristics of a plurality of bridges. In one embodiment, the bridge-characteristic data store 110 is the National Bridge Index. Bridge characteristics described in the bridge-characteristic data store 110 include a unique bridge identifier that may be used to correlate the bridge information with bridge information in other data sources. Bridge characteristics within the bridge-characteristic data store 110 include, but are not limited to, design loads, operating factors, traffic data, route classification, bridge-posting limits, and bridge physical characteristics. Many other bridge characteristics may also be stored within the bridge-characteristic data store 110.

The bridge-condition data store 115 includes a computer-readable media suitable for storing information. The bridge-condition data store 115 stores information describing the condition of various elements of a plurality of bridges. In one embodiment, the element's condition is described in accordance with the 2008 AASHTO Manual for Bridge Evaluation. As described in more detail subsequently, the elements of the bridge may be categorized into superstructure elements, substructure elements, deck elements, other elements, and special elements. In one embodiment, the bridge-condition data store 115 is maintained by a state bridge inspection agency such as a state's department of transportation. In embodiments of the present invention, bridges described in the bridge-condition data store 115 may have the same unique bridge identification number as is used in the bridge-characteristic data store 110.

The bridge-analysis server 120 is a computing device that contains software capable of executing various computer applications. The bridge-analysis server 120 may be networked with other computing devices including the other computing devices shown in computing environment 100. The bridge-analysis server 120 may communicate with the bridge-characteristic data store 110, the bridge-condition data store 115, the bridge-risk data store 125, and other components that may or may not be shown in FIG. 1.

The risk-factor application 122 calculates an overall risk factor for bridges described in the bridge-characteristic data store 110 and the bridge-condition data store 115. The bridge-risk factor for an individual risk may be defined as the probability of the bridge failing multiplied by the consequence of the bridge failure. The risk-factor application may receive information from the bridge-characteristics data store 110 and the bridge-condition data store 115 and use the data to calculate risk factors for one or more bridges. The risk-factor application 122 may also calculate constituent factors that are used to calculate the overall risk factors. The risk-factor application 122 may save both the overall risk factors and constituent factors in bridge-risk data store 125. The calculation of the overall risk factor is explained in more detail with reference to FIG. 2.

The bridge-risk data store 125 includes a computer-readable media. The bridge-risk data store 125 is a data store that stores the result of the overall risk factor calculation performed for a plurality of bridges by the risk-factor application 122. The overall risk factors from the plurality of bridges may be stored in a suitable data structure 127, such as a relational database. In addition to the overall risk factors, other intermediate factors used to calculate the overall risk factor may also be stored in the bridge-risk data store 125.

The web server 130 is a computing device capable of interfacing with other computing devices over a network. The web server is capable of hosting web pages and communicating their constituent portions to requesting web browsers over a network, such as the Internet. The bridge-data-retrieval application 132 is executed by the web server 130. The bridge-data-retrieval application 132 communicates with the display application 150 on client device 145 to display the bridge-index data on a graphical-user interface 147. The bridge-data-retrieval application 132 interfaces with the index data within the bridge-risk data store 125 and converts it into a format suitable for display on a graphical-user interface 147. In one embodiment, the graphical-user interface 147 includes a map on which the bridges are located using spatial coordinates stored in association with the bridges in the bridge-risk index 125. An example of such a graphical-user interface 147 is shown in more detail with reference to FIG. 3. The mapping component 160 is a combination of hardware and software that provides map data. The mapping component 160 may be provided by a third party that makes the mapping data available. The map data is accessed through the map API 155. ERSI, Google and Yahoo provide mapping components that may be suitable for use in embodiments of the present invention.

Figure 2:
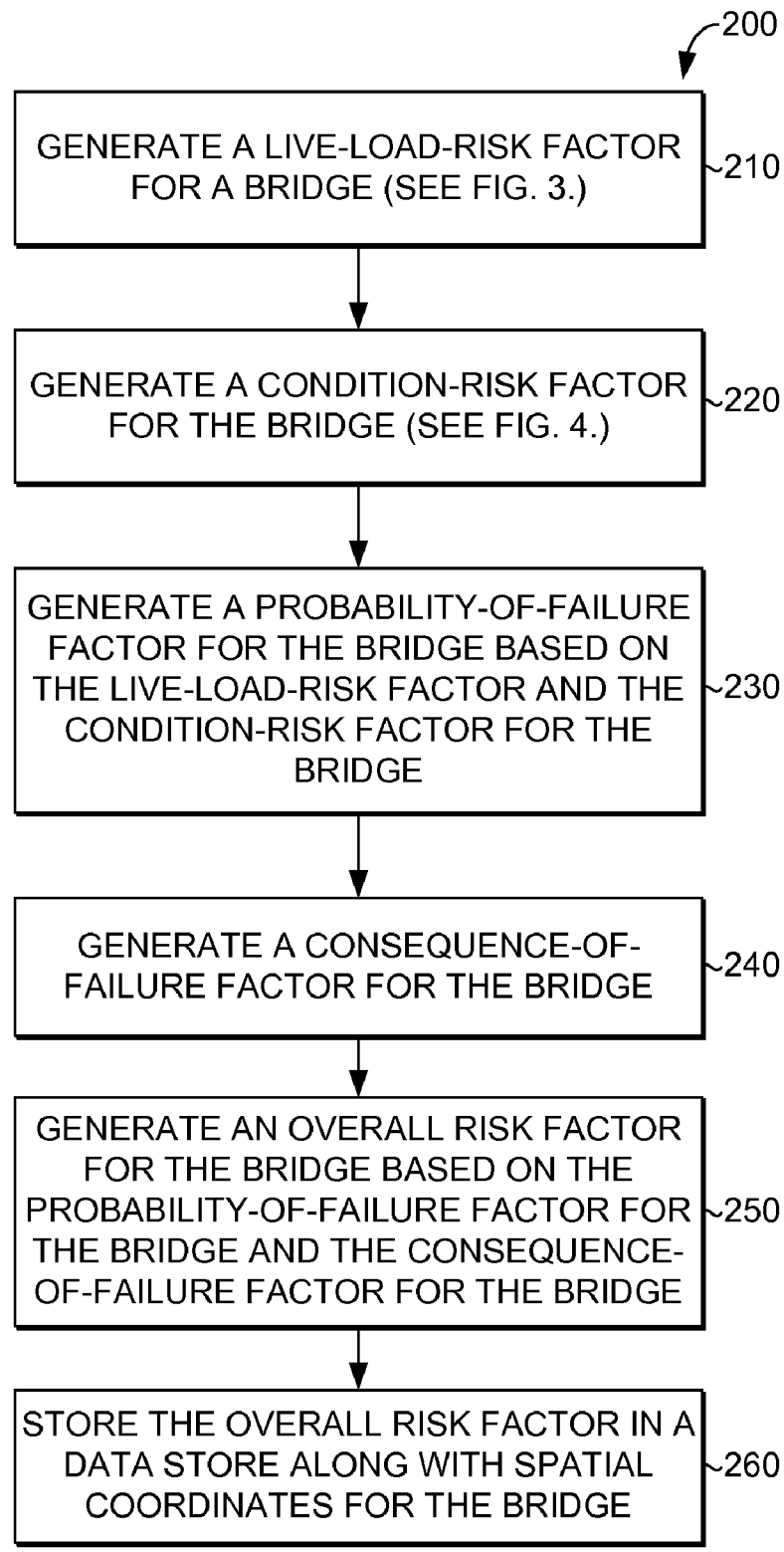
FIG. 2 illustrates a method in accordance with one embodiment of the present invention for presenting project information to a user.

FIG. 2 shows a method 200 for calculating an overall risk factor for a plurality of bridges. The method uses a software tool that will allow the user to prioritize bridge repairs using a risk-based approach to a group of bridges. A risk-based approach will allow a more optimal and cost-effective allocation of limited resources. Embodiments of the invention, may define risk as a probability of occurrence of an unfavorable event multiplied by the consequences should such an event occur. Probability of failure is a measure of the likelihood of occurrence of a structural failure of one or more components of the bridge in view of the live-load conditions on the bridge. The consequences of failure are dependent on the bridges importance to society.

Initially, bridge characteristics for each of the plurality of bridges may be retrieved from one of more data bases. For example, features such as Highway Agency District, County, Inventory Route, Features Intersected, Facility Carried, Structure Number, Latitude and Longitude, Owner, Maintenance Responsibility, Year Built, Structure Type, Main Material, Type of Design, Structure Type Approach, Material Type of Design, and Structure Length may be retrieved from a data base. Condition information may be retrieved from a bridge-condition data base. Many of the states have implemented element-level bridge inspection, most of them adopting a condition state methodology similar to the American Association of State Highway and Transportation Officials' Commonly Recognized ("AASHTO CoRe") element standard. In a condition state inspection, the deterioration of a bridge element is classified into a small number of categories (3 to 5) having precise engineering definitions. Only the worst of the condition states indicates the imminent probability that the element may fail to meet its intended function. Other condition states indicate less severe conditions that may or may not warrant some form of preventive action. These conditions may be recorded in the bridge-condition data base. In one embodiment, bridge-characteristics and bridge-condition data are stored in a single data base. If the two data bases do not share common bridge identification numbers for individual bridges, then the information in the two databases would need to be correlated. However, it is common for state condition data bases to include the NBI bridge identification number in a description of a bridge.

Initially, bridges that meet designated criteria may be filtered out of the evaluation. For example bridges on the historical registry, bridges that are closed, and culverts could be excluded. In addition, a filter may be added so that only the primary direction of the bridge is evaluated. Some databases list a bridge twice, once for each direction of traffic. Using a filter that eliminates one side of traffic for a bridge reduces the probability of evaluating the same bridge twice. In addition, bridges whose records lack the information needed to calculate an overall risk factor may be filtered out, or specially designated as lacking adequate data.

At step 210, a live-load-risk factor is generated for each bridge within the plurality of bridges. The live-load-risk factor measures the risk caused by the current traffic loads relative to the bridge capacity. Quantifying the probability of failure from loads involves comparing the frequency of live-load events and a bridge's vulnerability to these events. Traffic and especially heavy trucks are predictable live-load events experienced by a bridge. Overloading of a bridge may happen from a single overloaded truck or from the presence of two or more heavy trucks. The live-load-risk factor for a bridge increases as the bridge's capacity to handle live loads increases and is decreased by the increased frequency of live-load events, which increases the overload potential. In equation form, the live-load-risk factor equals a live-load-vulnerability factor (representing the bridges capacity to handle a live load) times a traffic-adjustment factor (representing an overload potential).

Embodiments of the present invention determine a bridge's live-load-vulnerability factor using one of several measures of a bridges capacity to bear a live load. For example, the design load, NBI load rating, or the maximum state legal load (posting limit) may be utilized to generate the live-load-vulnerability factor. In one embodiment, the live-load-vulnerability factor is expressed in terms of the HS 20 rating. The HS 20 rating is a design loading promulgated by AASHTO through the *AASHTO Standard Specifications for Highway Bridges*. The HS 20 rating is based on an axle load of 32 kips. The axel load may be divided over two tires spaced six feet apart on an axel traverse to the direction of traffic. However, embodiments of the present invention are not limited to the units of measure used to represent the various factors explained throughout this description. For example, the procedures can also be adapted to include the Load and Resistance Factor Rating (LRFR) methodology.

In one embodiment, the NBI load rating is used. Field 64 of the NBI database contains the load rating in tons. The HS 20 rating factor may be calculated by dividing the operating rating by 36 tons. Load rating is primarily a measure of the inherent level of safety in a bridge for live loads that use the bridge on a regular basis. Live loads may also be calculated using the Load and Resistance Factor Rating (LRFR) methodology. It is a good indicator of the bridge's vulnerability to live loads in general and specifically overloads. The standard practice for live-load assessment of bridges is currently the Manual for Condition Evaluation. The AASHTO HS loading is used to determine the load rating reported to the NBI in Item 64. The present standard for load rating bridges is the load factor method. The inventory ratings represent the design standard and can be considered conservative for most evaluations. The operating load rating may be a better indicator of live-load safety for in-service bridges than the inventory rating as it represents the maximum safe live loading for a bridge.

In another embodiment, the live-load-vulnerability factor is calculated using the design load for the bridge. The design load may be found in NBI Item 31. In one embodiment, the design load is used when a load rating is not provided in the NBI. Not all bridges may have a valid load rating. For bridges where a load rating may not be available, the original design load for the bridge may be used as a default value (with adjustments for condition). The design load may be converted to an HS20 equivalent value so it can be used with the same algorithm used to calculate the live-load-risk factor from the live-load-vulnerability factor. Some older bridges were designed to H10 or H15 standards and will need to be converted to the HS 20 standard. Embodiments of the invention are not limited by the standards used.

In another embodiment, the bridge postings may be used to determine the live-load-vulnerability factor. Some states allow exclusion vehicles that are significantly heavier than the federal legal loads, and HS20 in some cases. Bridge safety is impacted by state legal loads that are allowed unrestricted operation in a state. NBI Item 70 evaluates the load capacity of a bridge in comparison to the state legal loads. The National Bridge Inspection Standards require the posting of load limits only if the maximum legal load configurations in a state exceed the load permitted under the operating rating. Highway agencies may choose to post at a lower level. State legal loads vary from state to state. Under NBI guidelines, Item 70 shall be coded 4 or less only if the legal load of the state exceeds that permitted under the operating rating. The degree that the operating rating is less than the maximum legal load level may be used to differentiate between codes. Table 1 shows the code relationship in NBI of operating rating to maximum legal load.

TABLE 1

| | |
|---|---|
| 5 | Equal to or above legal loads |
| 4 | 0.1-9.9% below |

TABLE 1-continued

| | | |
|---|---|---|
| 3 | 10.0-19.9% | below |
| 2 | 20.0-29.9% | below |
| 1 | 30.0-39.9% | below |
| 0 | >39.9% | below |

Item 70 and Item 64 (i.e., the load rating) are combined to derive the governing live-load-vulnerability factor within the live-load-risk calculation. Item 64 provides a capacity assessment based on HS20 loading and Item 70 provides an assessment based on maximum state legal loads, which may be heavier than HS20. In one embodiment, the lower of the two will be used in the live-load-vulnerability factor because the lower live-load-vulnerability factor results in a more conservative risk-factor calculation. Thus, if the HS20 operating-rating factor is higher than 2 and the bridge-posting-rating factor is 0.9, then the operating-rating factor of 2.0 is used to calculate the live-load-vulnerability factor.

As described previously, the operating ratings from Item 64 is divided by 36 to arrive at an HS20 operating-rating factor. The bridge postings, which represent percentages, need to be converted to units of measure that can be compared with the HS20 operating-rating factor. In one embodiment, the NBI bridge postings are converted as shown in Table 2.

TABLE 2

| Item 70 Code | Item 70 Rating Factor |
|---|---|
| 5 | 1.0 |
| 4 | 0.9 |
| 3 | 0.8 |
| 2 | 0.7 |
| 1 | 0.6 |
| 0 | N/A |

These rating factors were chosen to be compared with the operating rating or HS20 equivalent design load. Embodiments of the invention are not limited to the rating factors shown. Conceptually, the rating factors generating from the bridge posting data should be comparable to the operating rating. The examples shown are for the sake of illustration.

The operating rating is adequate for redundant superstructure systems, which posses a system safety reserve in case of element failure. However, the operating rating is unconservative for fracture-critical bridges with nonredundant superstructure systems. NBI Item 92A identifies fracture-critical bridges. Embodiments of the present invention may reduce the live-load-vulnerability factor by multiplying it by a reduction factor. In one embodiment, the reduction factor is 0.85. Multiplying by the reduction factor will decrease the risk factor (where a low-risk factor indicates a high urgency of repair).

The overload potential, which is multiplied times the live-load-vulnerability factor to calculate the live-load-risk factor, is based on bridge traffic. The average daily truck traffic ("ADTT") (NBI Item 109) is a good indicator of likely maximum truck loads on a bridge. Maximum truck weights and multiple presence probabilities are seen to increase with increasing ADTT. The ADTT may be given as percentage of the Annual Average Daily Traffic ("AADT"). In one embodiment, the ADTT is converted into a number of vehicles for use in the determination. A modifier based on site truck traffic exposure may be used as the overload potential. Table 3 shows traffic-adjustment factors (used as the overload potential) that can be used based on an ADTT (as measured in trucks per day).

TABLE 3

| ADTT | Traffic-adjustment factor (Reflects Overload Potential) |
|---|---|
| ≤1000 | 1.00 |
| ≥5000 | 0.80 |

Linear interpolation may be used to generate the overload potential for other ADTT values between 1000 and 5000 trucks per day. Once the traffic-adjustment factor is generated based on the ADTT, the live-load-risk factor for the bridge may be calculated by multiplying the overload potential (traffic-adjustment factor) times the live-load-vulnerability factor. Bridges that have a live-load-risk factor less than 1.0 should be considered vulnerable to damage or failure due to live loads.

At step 220, a bridge-condition risk factor for each bridge within the plurality of bridges is generated. Many states have implemented element-level bridge inspection, most of them adopting a condition state methodology similar to the AASHTO CoRe element standard. In a condition state inspection, the deterioration of a bridge element is classified into a small number of categories (3 to 5) having precise engineering definitions. Only the worst of the condition states indicates the imminent probability that the element may fail to meet its intended function. Other condition states indicate less severe conditions that may or may not warrant some form of preventive action.

An element level inspection decomposes a bridge into its constituent elements. The elements describe all the primary structural components of a bridge, which can be visually inspected. AASHTO has defined a group of Commonly Recognized (CoRe) elements (about 108) that are common to all bridges nationwide. A group of smart flags has also been defined to model specific problems or distress not reflected in the condition state language. An average bridge has about seven elements. Foundations may not be counted as elements because their condition may not be measurable in inspections. The CoRe element specification provides the ability for an agency to add its own subelements (to enable a more detailed classification), or non-CoRe elements (to accommodate types of elements that are not covered by the CoRe definitions).

Each level of deterioration is called a condition state. The AASHTO CoRe element manual specifies the definition of each element, the unit of measurement, definitions of a set of 3-5 standardized condition states, and lists of typical feasible actions for each condition state. When a bridge is inspected, the total quantity of each element is allocated among the condition states based on the visual observations of the inspector. The general pattern goes as follows:

1. Protected. The element's protective materials or systems (e.g., paint or cathodic protection) are sound and functioning as intended to prevent deterioration of the element.
2. Exposed. The element's protective materials or systems have partially or completely failed (e.g., peeling paint or spalled concrete), leaving the element vulnerable to deterioration.
3. Attacked. The element is experiencing active attack by physical or chemical processes (e.g., corrosion, wood rot, traffic wear-and-tear), but is not yet damaged.
4. Damaged. The element has lost important amounts of material (e.g., steel section loss), such that its serviceability is suspect.
5. Failed. The element no longer serves its intended function (e.g., the bridge must be load posted).

The condition risk index evaluates the safety of the bridge based on its element derived condition. Structural safety of the bridge may be evaluated from the condition of either the superstructure or the substructure. This safety measure may then be modified by the deck, other, and special elements that have secondary contributions to the structural safety.

Embodiments of the invention may use the condition of superstructure elements, substructure elements, deck elements, other elements, and special elements to calculate the bridge-condition risk factor for a bridge. Superstructure elements include all of the primary load-carrying elements spanning between substructure elements. It does not include secondary elements such as diaphragms, bracing, and drainage features. Pin-and-hanger elements are included as superstructure elements, since failure of one would have the same effect as failure of the girder it supports. Within the AASHTO CoRe guidelines, the CoRe elements for this category are numbered as 100-199 for regular superstructure elements and 38-55 for slabs where the deck is the superstructure element. When coating systems are recognized separately from steel elements, they are not included in this category since they do not pertain to bridge safety.

Substructure elements include all of the primary load-carrying elements supporting the superstructure. It also includes culverts. Secondary elements such as bracing, slope paving, wingwalls, and waterway protection are not included. CoRe elements for this category are numbered as 200-299. Among these elements are Column/pile extension (201-206), Pier wall (210, 211), Abutment (215-217), Submerged pile cap/footing (220), Submerged pile (225-228), Cap (230-235), and Culvert (240-243).

Decks and slabs include decks supported by superstructure elements. It does not include slabs supported directly by the substructure. This category does include decks that contribute to the superstructure where composite action is present. Agencies that recognize wearing surfaces separately from decks would not include them in this category since they do not have a direct effect on safety. Drainage features may not be included. CoRe elements for this category are numbered as 1-99, with exceptions for slab bridges (38-55).

Other safety-related elements include all elements not included in any of the above categories, but which still have some direct or imminent effect on the safety of the structure. Many states have custom elements that could fit in this category. CoRe elements for this category are between 300 and 355 but may not include all of the CoRe elements in that range. Among elements included as other elements are Approach slabs (320, 321) and Bearings (310-315).

Special elements (Smart Flags), as defined by the AASHTO CoRe element guide, include a special set of elements called Smart Flags. Smart Flags are intended to highlight a problem that does not fit into the element level data collection. Since Smart Flags can often indicate a severe defect having safety implications, they are quite relevant to the bridge-condition risk factor calculation. Under the CoRe element definitions, Smart Flags do not record a percentage of an element in each condition state. The CoRe smart flags considered under the Special Elements category are as follows: Steel fatigue (356), Deck cracking (358), Soffit cracking (359), and Settlement (360).

In one embodiment, each element is recognized in the bridge-condition risk factor calculation when a portion of it is in one of the two worst element-condition states. For superstructures and substructures, the worst condition state may feature the language, "[deficiency] is sufficient to warrant structural analysis to ascertain the impact on the ultimate strength and/or serviceability of either the element or the bridge." The worst element-condition state is fully counted in the calculation of the bridge-condition risk factor for a bridge. The second-worst condition state is also considered to have safety implications of a lesser nature. The formula for the second-worst condition state weighting factor is $$WF = \frac{\text{Condition State Number} - 1}{\text{Number of Condition States} - 1} \quad \text{(Equation 1)}$$

Superstructure and substructure elements are usually measured in terms of linear units (e.g., meters), or per piece (e.g., each column). Since it would be awkward to attempt to convert all elements to the same measurement system, conditions are indicated in percents instead. Therefore, the percentage of an element in the two worst condition states is the main input to the bridge-condition risk factor calculation. All elements within a category may be assumed to have an equal effect on the performance of the category as a whole.

As the percentage of an element in its most deteriorated state increases from zero over time, the importance of the first percentage points of severe deterioration is much greater than the later points. In other words, the movement from 0% to 1%, is of much greater significance than the movement from 50% to 51%. This effect is theoretically nonlinear but difficult to quantify exactly. To keep the methodology simple, the condition index recognizes a linear importance from 0% to 25% and no additional effect beyond 25%. In effect, the percentage in the worst condition state is capped at 25% for each category. The choice of 25% was made for compatibility with the AASHTO CoRe element definitions for bridge decks, but embodiments of the present invention are not limited to capping the condition at 25%.

If the bridge is fracture-critical, the urgency of correcting deterioration is increased. For this reason, the proposed methodology doubles the condition percentages for superstructures on fracture-critical bridges. For concrete decks and slabs (12-27, 38-53) most states follow the CoRe element definitions of condition states, which describe the extent, but not severity, of deterioration. For example, the definition of the worst deck-condition state is that "the combined area of distress is more than 25% of the total deck area." Under this system, the inspector assigns the entire deck to just one of the condition states. Although this is different in format it still satisfies the requirements defined earlier as the percentage in an unsafe condition is given. The CoRe element definitions of distress include both spalls and repaired areas, even though only the former have clear safety implications. An embodiment of the invention handles CoRe element deck condition states by recognizing the middle point of the range of extent of each condition state, as shown in Table 4.

TABLE 4

| State 1: | 0% |
| State 2: | 1% |
| State 3: | 6% |
| State 4: | 17.5% |
| State 5: | 25% |

Note that the methodology caps the recognized distress at 25%, so there is no benefit to using a higher percentage for state 5. Decks are given enough weight in the index to reduce the condition index to 0.75. Deck elements that follow the normal percentage-in-condition system are treated in the previously described manner.

Elements in the category of other elements usually can't by themselves justify a rehabilitation, but contribute to the need when other elements are badly deteriorated. Condition state definitions in this category are diverse, but in general the worst state reflects the idea that the functionality of the element has been seriously compromised.

The condition language for the special elements (smart flags) varies and only some of the conditions indicate a problem. To use the smart flags the language of each is considered and the smart flag may be given no influence if it is not indicating a critical condition. If a critical condition is indicated for the substructure or superstructure, the maximum deficiency of 25% is assigned to the category. If a critical condition is indicated for the deck (but not in the substructure or superstructure) a deficiency of 10% is assigned to the category. The special elements category total is not determined by the average of the elements as is done for the other categories but by the maximum. Table 5 shows which global smart flag indications trigger a use in the category total, 0 records indicate the smart flag should be ignored, otherwise the percentage deficiency assigned is indicated. Condition states not represented for a given smart flag are crossed out. This approach is intended to include the important smart flags in a manner that is not overly complicated and that does not result in the same information being counted twice. Embodiments of the present invention are not limited to the special element percentages allocated in Table 5, other allocations are possible. Those shown are for the sake of illustration.

TABLE 5

| CoRe Smart Flag | 1 | 2 | 3 | 4 | 5 |
| --- | --- | --- | --- | --- | --- |
| 356 Steel Fatigue | 0 | 0 | 25% | | |
| 360 Settlement | 0 | 0 | 25% | | |
| 358 Deck Cracking | 0 | 0 | 0 | 10% | |
| 359 Soffit Cracking | 0 | 0 | 0 | 0 | 10% |

FIG. 9 shows a worksheet illustrating an example of the proposed bridge-condition risk factor calculation. The basic procedure is to calculate a demerit quantity for each element category, then subtract the total demerits from 100 and divide the result by 100 to yield the condition factor.

The most recent inspection results for each element are entered in the appropriate category shown in FIG. 9. States that use the CoRe elements will find that superstructure and deck elements usually have five condition states, substructures four, and other elements three. However, it is not required that these numbers of states be used. For the Superstructure, Substructure, Deck, and Other categories enter the percentage found in the worst defined condition state for each element in the "Worst" column. Enter the percentage found in the 2nd worst defined condition state for each element in the "2nd Worst" column. In the "WF" column, enter the weighting factor for the 2nd worst condition. If the element is one of the CoRe concrete deck types the value to be entered in the "Worst" column is determined as described previously, no value is entered in the "2nd Worst" column as the CoRe system for decks assigns a single condition state to the entire deck. Add the percentage in "Worst" to the percentage in "2nd Worst" multiplied by the "WF" and enter in the "Deficient" column. At the bottom of the "Deficient" column, enter the average value of the numbers in that column for each category.

In the superstructure section, the average percentage in deficient condition is doubled if the superstructure is fracture-critical. The factor of 2 appears to have an appropriate effect, but embodiments of the present invention are not limited to this factor. Below the substructure section, enter the larger of the superstructure or substructure values. Superstructure and substructure are separated because it is common for a bridge to have a different number of elements in the superstructure than in the substructure. For example, in worksheet 1 there are three substructure elements but only one superstructure element. If the two sections were combined, the single superstructure element would be just one of four, and thus, would have one-fourth of the total weight. It may be desirable to ensure that the superstructure and substructure have equal weight regardless of the number of elements included in each.

Since either the superstructure or the substructure, if sufficiently deteriorated, can by itself warrant rehabilitation or replacement, the methodology recognizes the worse of the two. This provision also allows the method to work correctly on bridges lacking superstructure elements, such as culverts. The percentage is multiplied by a factor of 2.5 to yield the total demerit for superstructure and substructure. The 2.5 factor was chosen as representative of the importance of the superstructure or substructure. The factor enables the condition in one of these two categories to reduce the index to 0.375 if enough deterioration is present.

Bridge decks are handled in a manner similar to substructures, but the average percentage in the deficient condition is multiplied by a factor of only 1. This is sufficient to lower the condition index to 0.75 if the deteriorated deck area is above 25%, but is not enough to lower the index to 0.375 as is possible for the superstructure and substructure. The category of Other elements is also handled in a manner similar to substructures. The category of Special elements is handled differently. The results entered into the table will be zeroes or percentages given in Table 4. The maximum percentage (0%, 10%, or 25%) is taken for the category total.

At the bottom of the forms sum the demerits, subtract the sum from 100, and divide by 100. This provides a bridge-condition risk factor.

In summary, the bridge-condition risk factor evaluates the safety of the bridge based on its element-derived condition. Structural safety of the bridge is evaluated from the condition of either the superstructure or the substructure. This safety measure is then modified by the deck, other, and special elements that have secondary contributions to the structural safety.

At step 230, a probability-of-failure factor for each bridge within the plurality of bridges is generated. The probability of failure is an additive combination of two vulnerabilities. Specifically, the condition-based vulnerability, as measured by the bridge-condition risk factor, and the live-load vulnerability, as measured by the live-load risk factor, are combined to calculate the probability-of-failure factor for a bridge. Additive strategies may use weighting factors to capture the relative importance of component vulnerabilities in the probability-of-failure calculation. The following equation provides an equation for calculating the probability-of-failure factor using weighting factors: Probability of Failure=$WF_C$×Bridge-condition risk factor+$WF_L$×Live-Load-Risk Factor.

$WF_C$ and $WF_L$ are weighting factors. Some latitude is available in the selection of these factors. Bridge deficiencies in a state and owner input can be considered in their selection. They can also be calibrated based on other objective criteria like past failures or road closures. In one embodiment of the present invention, $WF_C$=$WF_L$=0.50, which gives both factors equal weight. In one embodiment, the probability-of-failure factor, the bridge-condition risk factor, and the live-load-risk factor are all numbers between zero and one.

At step 240, a consequence-of-failure factor is generated for each bridge within the plurality of bridges. The overall risk factor for a bridge is the product of multiplying the probability-of-failure factor and the consequence-of-failure factor. To develop the consequences-of-failure factor for a bridge it is important to identify the attributes that contribute to bridge importance. These attributes should be as comprehensive as possible, measurable and already available in the bridge file. The NBI is a good source of information for bridge importance factors. The following fields are valuable for use in the importance algorithm: Detour Length (Item 19), Functional Classification (Item 26), Average Daily Traffic (Item 29), Type of Service (Item 42), Bridge Length (Item 49), Bridge Width (Item 51), and Highway System of the Inventory Route (Item 104). Embodiments of the present invention may use one or more of these attributes to calculate the consequence-of-failure factor for a bridge.

In one embodiment, the consequence-of-failure factor for a bridge is based on a route importance, a detour length required if the bridge is closed, and the replacement cost of the bridge. For use in the calculation, each of these attributes is converted to a factor. In one embodiment, a detour factor is the log (AADT+the detour length). The detour length may be capped at threshold value, such as six miles, to limit the impact a detour length has on the consequence-of-failure factor. The replacement-cost factor may be calculated based on the bridge area. In one embodiment, a replacement factor of 1 is assigned to bridges with less than 1,500 square feet of area, 2 for bridges of between 1,500 and 3,500 square feet of area, 3 for bridges of between 3,500 and 7,000 square feet of area, 4 for bridges of between 7,000 and 15,000 square feet of area, and 5 for bridges having more than 15,000 square feet of area.

The route-importance factor is based on the type of road of which the bridge is a part. Loads that are determined to be unsafe for the bridge will need to be detoured leading to a loss in functionality. Loss in functionality has a bigger impact on bridges that are on a principal arterial road; provide access to emergency services, evacuation routes, and national defense; or are considered important to the local economy. Bridges on the National Highway System (NBI item 104), bridges on Principal Arterials (Item 26 Codes 01, 02, 11, 12), and bridges that are important to the local economy, (also bridges that carry critical utilities) should be designated as important bridges. Bridges needed for emergency response/public safety routes or an evacuation route should be designated as important bridges. All other bridges may be classified as standard bridges. The route importance-factor ("RIF") may be 1 for standard bridges and 2 for important bridges.

The consequence-of-failure factor may be calculated as $1-WF_{CF} \times RIF$ (Detour Factor+Replacement-Cost Factor). $WF_{CF}$ is a weighting Factor. In one embodiment, 0.01 is used as the weighting factor, but other factors may used as appropriate.

At step 250, an overall risk factor is generated for each bridge in the plurality of bridges. The overall risk factor is the consequence-of-failure factor for each bridge multiplied by the probability-of-failure factor for each bridge, calculated previously. At step 260, the live-load-risk factor, the bridge-condition risk factor, probability-of-failure factor, the consequence-of-failure factor, and the overall risk factor for each bridge in the plurality of bridges is stored in a data store, such as bridge-risk data store 125.

After risk factors have been calculated for a plurality of bridges, repairs to the bridges may be prioritized based on those risk factors. In one embodiment, the bridges' repairs are automatically prioritized based on the overall risk factors and displayed through a user interface.

Figure 3:
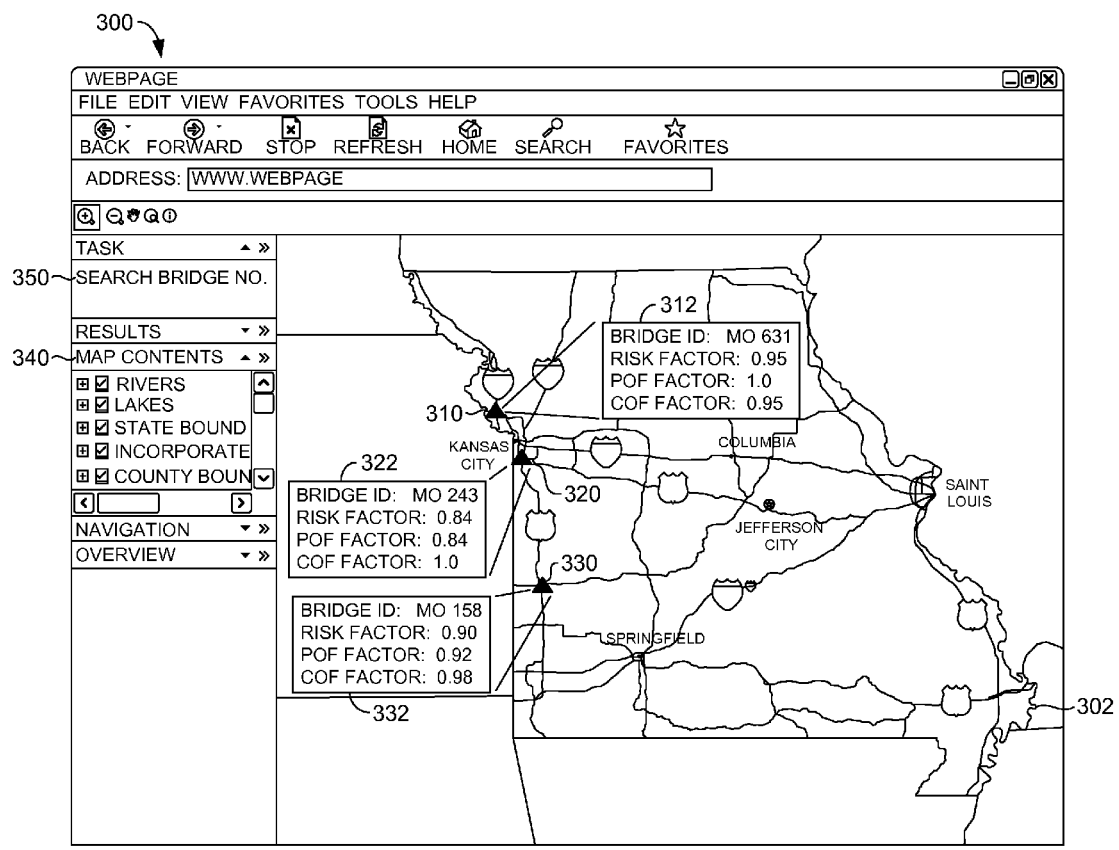
FIG. 3 illustrates a graphical interface for displaying the results of the bridge analysis, according to an embodiment of the present invention.

Turning now to FIG. 3 a graphical interface 300 for displaying the results of the bridge analysis is shown, in accordance with the embodiment of the present invention. The interface 300 may be displayed in a browser application. The state of Missouri can be seen in the map portion 302 of interface 300. Three different bridges are represented by icons on the map along with associated data in a pop-up window. In one embodiment, the pop-up window is shown when a user hovers over or clicks on a bridge icon 310, 320, and 330.

For example, upon hovering over bridge icon 310, the pop-up window 312 is displayed. The pop-up window 312 includes information describing the bridge, including the bridge ID of "MO 631," the overall risk factor of "0.95," the probability-of-failure ("POF") factor of "1.0," and the consequence-of-failure ("COF") factor of "0.95." Similarly, clicking on bridge icon 320 may open pop-up window 322. The pop-up window 322 includes a bridge id of "MO 243," an overall risk factor of "0.84," a POF factor of "0.84," and a COF factor of "1.0." Bridge icon 330 is associated with pop-up window 332. The pop-up window 332 shows risk information associated with bridge ID "MO 158." The overall risk factor for bridge 158 is "0.90." The POF factor for bridge MO 158 is "0.92." The COF factor for bridge 158 is "0.98."

In one embodiment, an icon is displayed for all bridges meeting a criteria entered in to the interface. In another embodiment, each bridge in the plurality of bridges evaluated is represented by a bridge icon on the map. Information about those bridges may then be displayed by clicking or hovering on the bridge icon associated with the bridges. A specific bridge may be located by entering the bridge number in the search interface 350. The features shown on the map such as roads, legal boundaries, rivers, lakes, and other features may be adjusted using interface 340.

FIGS. 1-3 describe a system and method for calculating an overall risk factor for one or more bridges. The overall risk factor may be used to determine the relative urgency of repairs recommended for each of a group of bridges. Knowing the relative urgency of bridge repairs helps planners prioritize the allocation of limited resources to make the most urgent repairs first. As was explained previously, the overall risk factor for a bridge is calculated by multiplying a probability-of-failure factor for the bridge times a consequence-of-failure factor for the bridge. The probability-of-failure factor is itself the result of adding the product of multiplying the bridge-condition risk factor times a weighting factor plus the product of multiplying the live-load risk factor with a second weighting. The live-load-risk factor is calculated by multiplying the live-load-vulnerability factor times the traffic-adjustment factor. Each of these factors has been explained previously with reference to FIG. 2; however, an additional explanation of these various factors will be given in FIGS. 4, 5, and 6. It should be also noted that each of these factors may hold some value, independent of calculating the overall risk factor, to a planner in evaluating the urgency of repairs needed for a bridge. For example, an engineer may be interested to know that an overall risk factor for a bridge is high because the probability of failure is high while the consequence of failure is comparatively low. The other factors calculated as part of determining the overall risk factor for a bridge may also help describe the bridge's condition to an engineer or planner studying the bridge. As was seen in FIG. 3, these factors may be displayed on a user interface upon selecting a bridge.

Figure 4:
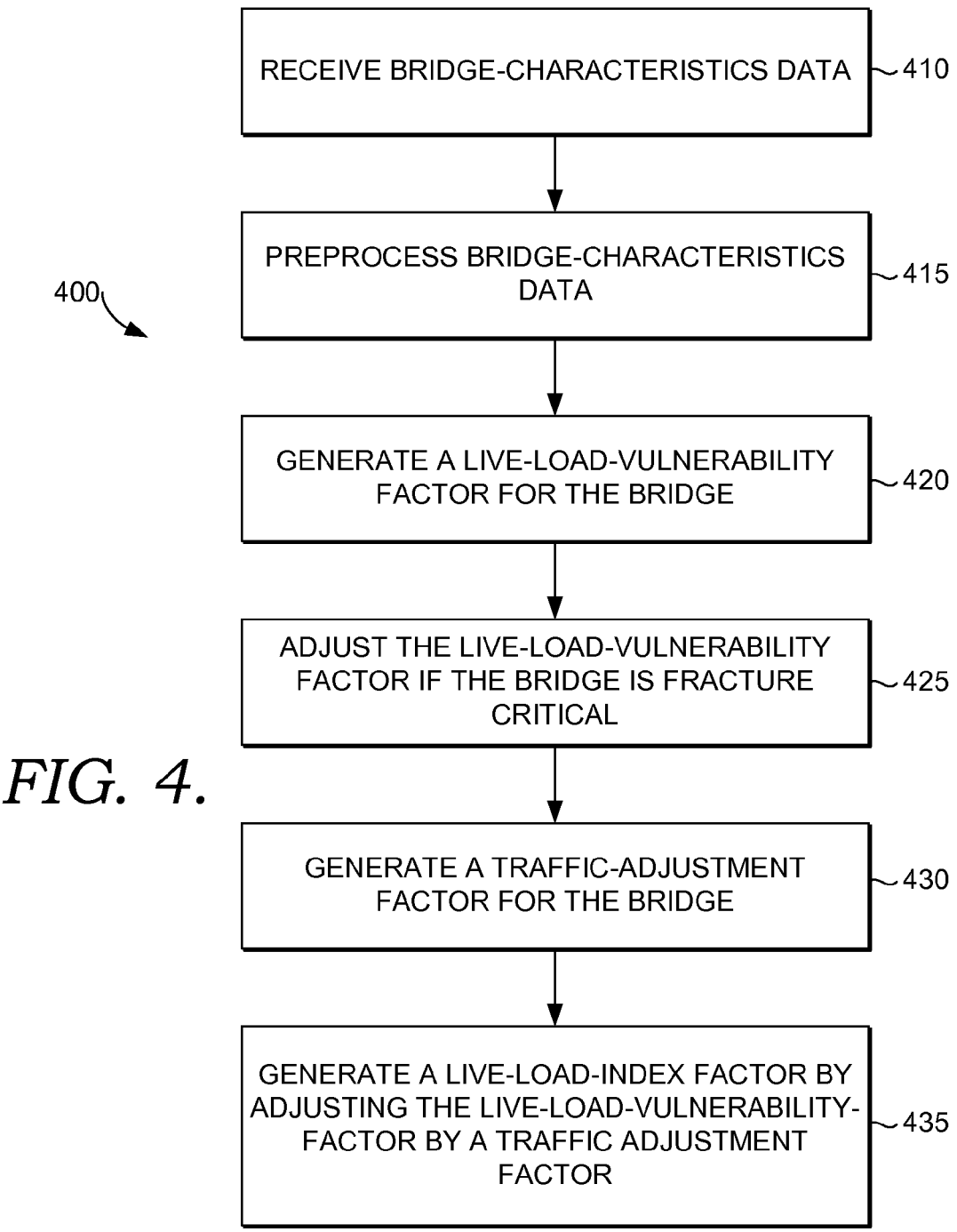
FIG. 4 illustrates a method of generating a live-load-risk factor, in accordance with an embodiment of the present invention.

FIG. 4 shows a method 400 of generating a live-load-risk factor, in accordance with embodiments of the present invention. At step 410, data is received or retrieved from a bridge-characteristic database. In one embodiment, the bridge-characteristic database is the NBI database. Embodiments of the present invention are not limited to using the NBI database, but the data used in examples shared with reference to FIG. 4 will conform to data formats used in the NBI database. Data retrieved from the bridge-characteristic database includes, but is not limited to a design load, an operating rating, a bridge posting, and a fracture-critical designation.

At step 415, the data retrieved for a particular bridge is preprocessed to prepare the data for use in the live-load-risk factor determination. Preprocessing the data includes inserting values where there is a null value in certain fields within the retrieved data and generating a calculation error when there is a null value in a required field. The live-load capacity used to calculate the live-load-risk factor may be derived from several sources including a design load, the operating rating, and the bridge posting. If the bridge data lacks data for all of these values then an error should be generated. Similarly, if the fracture-critical field is null then a calculation error may be generated. If a design load is null, then the design load may be changed to zero for the sake of proceeding with the calculation. Similarly, if the operating rating is null then the operating rating may be set to zero. If the bridge-posting value is null then a bridge posting of 5 may be inserted. A bridge posting factor of 5 means the bridge posting is equal to or above the maximum legal load. Having preprocessed the data received from the bridge-characteristic database, so that calculations fail or null values are replaced with values suitable for the calculation to proceed, the next step is to begin the calculation.

At step 420, a live-load-vulnerability factor is generated. The live-load-vulnerability factor may be equal to the lower value between the posting-rating factor and operating-rating factor for each bridge. Before this comparison can be made an operating factor and a bridge-posting factor must be determined for each bridge. If one of the two factors is not able to be determined for the bridge because of the lack of data then the remaining factor that was able to be calculated becomes the live-load-vulnerability factor.

The operating rating for a bridge may be determined in one of two ways. First, the operating rating may be specified in the bridge-characteristic database. Second, the operating rating may be calculated based on a design load designated in the bridge-characteristic database. In one embodiment, it may be preferable to select the designated operating rating as the operating rating used in the calculation. For sake of the live-load-vulnerability factor determination, both a designated operating rating and a live load may be converted to an HS20RF format. The designated-operating rating in the NBI database may be converted to HS20RF format by dividing the designated operating range by 36. Similarly, the design load may be converted into HS20RF format. In one embodiment, the design load is only used to determine the operating rating if a designated-operating rating is not specified in the bridge-characteristic database.

A bridge posting has been described in some detail previously with reference to FIG. 2. In general, the bridge postings of interest for the live-load-vulnerability factor calculation is bridge postings below the maximum legal load for the bridge. These bridge postings may be made by state agencies and may indicate a structural deficiency with the bridge.

Having determined both a posting-rating factor and an operating factor or either a posting-rating factor or an operating factor, the final part of step 420 is to select either the posting-rating factor or the operating rating. As described previously, if only one or the other is calculated then the sole available factor is used as the live-load-vulnerability factor. If both a posting-rating factor and an operating rating are available, then the lower of the two numbers is used for the live-load-vulnerability factor. Thus, if the posting-rating factor is greater than the operating-rating factor then the operating-rating factor is selected. On the other hand, if the posting-rating factor is lower than the operating-rating factor then the posting-rating factor is used as the live-load-vulnerability factor.

At step 425, the live-load-vulnerability factor is adjusted by a fracture-critical factor if the bridge is designated as fracture critical. In one embodiment, the fracture-critical factor is 0.85.

At step 430, a traffic-adjustment factor is calculated. The traffic-adjustment factor is calculated to multiply with the live-load-vulnerability factor to arrive at the live-load-risk factor. The traffic-adjustment factor reflects the actual operating load on the bridge. As explained previously, the traffic-adjustment factor may be calculated by using the average daily truck traffic that passes over the bridge. The average daily truck traffic may be determined from entries in the bridge-characteristic database. In one embodiment, the average daily truck traffic is calculated by multiplying the average annual daily traffic by the percentage of average daily truck traffic given in an NBI database. The result of this calculation is the average daily truck traffic in trucks per day. In one embodiment, if the trucks per day are less than or equal to 1,000 trucks then the traffic-adjustment factor is 1, essentially meaning that the truck traffic has a negligible impact on the live-load-risk factor. When the average daily truck traffic is greater than or equal to 5,000 then the traffic-adjustment factor may be set to 0.8. A traffic-adjustment factor of 0.8 will effectively reduce the live-load-risk factor by 80%. Reducing the live-load risk factor will effectively increase the urgency of repairs on the bridge as determined by the ultimate risk factor calculated for the bridge. Traffic-adjustment factors between 1 and 0.8 may be extrapolated for values between 1,000 and 5,000.

At step 435, the live-load-risk factor is calculated by multiplying the live-load-vulnerability factor by the traffic-adjustment factor. The live-load-risk factor may then be entered in a data store. In addition, the traffic-adjustment factor and the live-load-vulnerability factor may also be recorded in a database for future display for retrieval.

Figure 5:
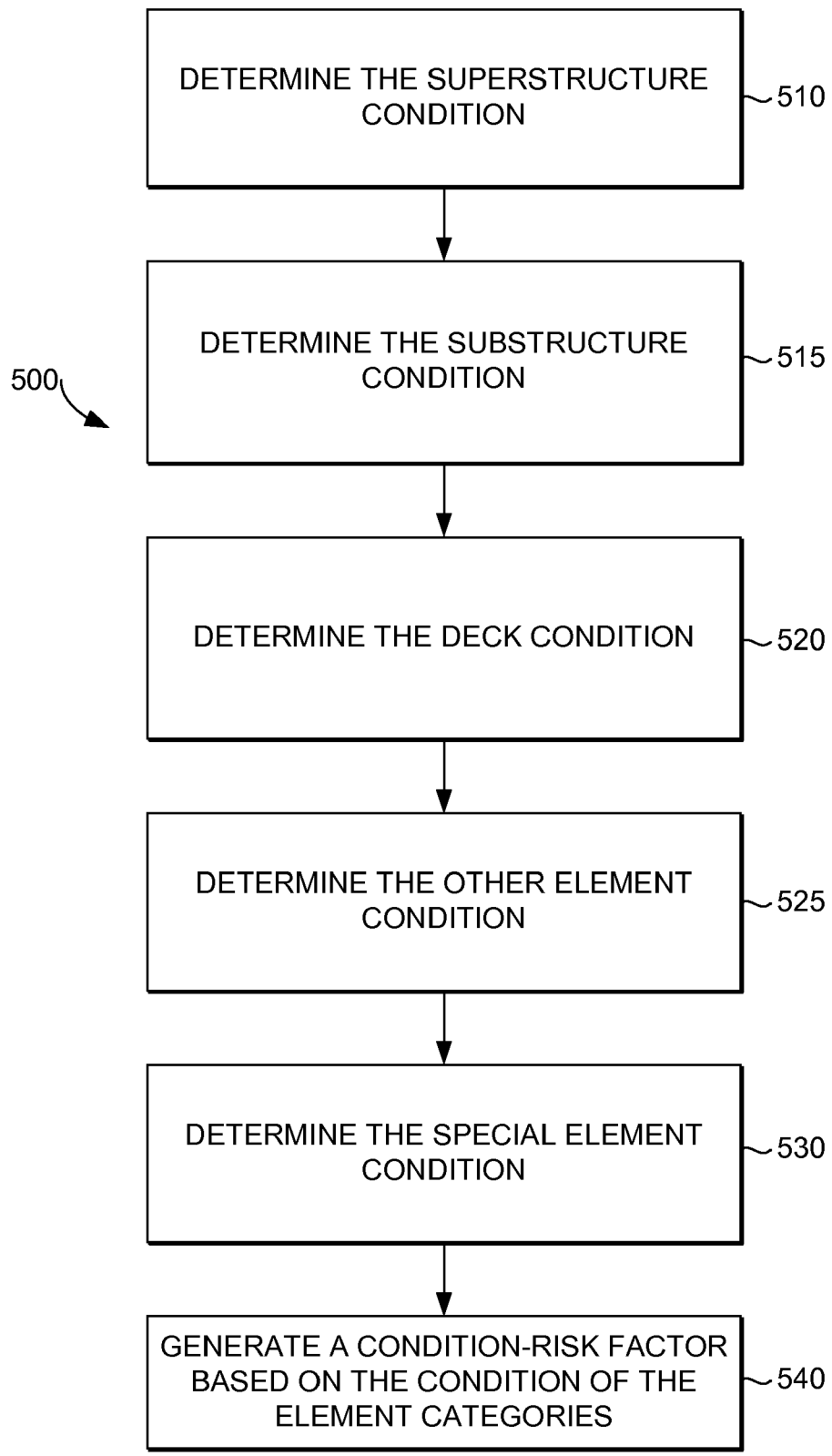
FIG. 5 illustrates a method of calculating a bridge-condition risk factor, in accordance with an embodiment of the present invention.

Turning now to FIG. 5, a method 500 of calculating a bridge-condition risk factor is shown according to embodiments of the present invention. The bridge-condition risk factor is a metric intended to indicate what percentage of a bridge is in poor structural condition. In general, the bridge-condition risk factor is calculated by determining the average condition for one or more categories of bridge elements. The average condition of the bridge categories may then be weighted and combined to generate a bridge-condition risk factor index. Initially, the data used to determine the average condition of bridge element categories may be retrieved or received from a state bridge-condition database. In one embodiment, the state database analyzes the primary structural components of the bridge that can be visually inspected. AASHTO has defined a group of commonly recognized (CoRe) elements that are common to most bridges nationwide. The AASHTO manual has also specified standardized condition states for the various element categories. Different categories may use different condition states. The various condition states have been described previously with reference to FIG. 2. In general, the percentage of an element that falls into the worst condition state for that type of element and a weighted percentage of the element that falls into the second worst condition state is combined to generate a condition state for a particular element. The condition states for each element in a category are then averaged to arrive at an average category condition.

At step 510, the average condition of superstructure elements are determined. The average condition for superstructure elements are determined by analyzing each super-structure element. This calculation has been described previously with reference to FIG. 2. At step 515, the average substructure condition is determined. This determination has also been described previously with reference to FIG. 2. At step 520, the average deck condition is determined. At step 525, the average other element condition is determined. At step 530, the average special element is determined. If the bridge is determined to be fracture critical, the average superstructure condition may be multiplied by a multiplier such as 2. An average greatest structure is determined. The average greatest structure is the larger of the average super-structure condition and the average substructure condition. Recall that at this point, the average superstructure condition may have been multiplied by 2 if the bridge was fracture critical. If the average greatest structure is greater than 25% then the average greatest structure may be capped at 25%. The average greatest structure may then be multiplied by 2.5. Multiplying the average greatest structure by 2.5 increases the impact the average greatest structure has on the bridge-condition risk factor. The other condition categories may also be capped at 25% if they exceed 25%, otherwise the calculation proceeds with the originally determined average conditioned percentage. A bridge total condition may be calculated by adding the average greatest structure condition, the average deck condition, the average other element condition, and the average special element condition. If the bridge total condition is greater than 100 the bridge total condition may be capped at 100. At step 540, the bridge-condition risk factor is calculated by subtracting the bridge total condition from 100 and dividing by 100. This results in a bridge-condition risk factor of between 1 and 0. The lower the number the greater the condition risk and the higher the number the lower the condition risk.

Figure 6:
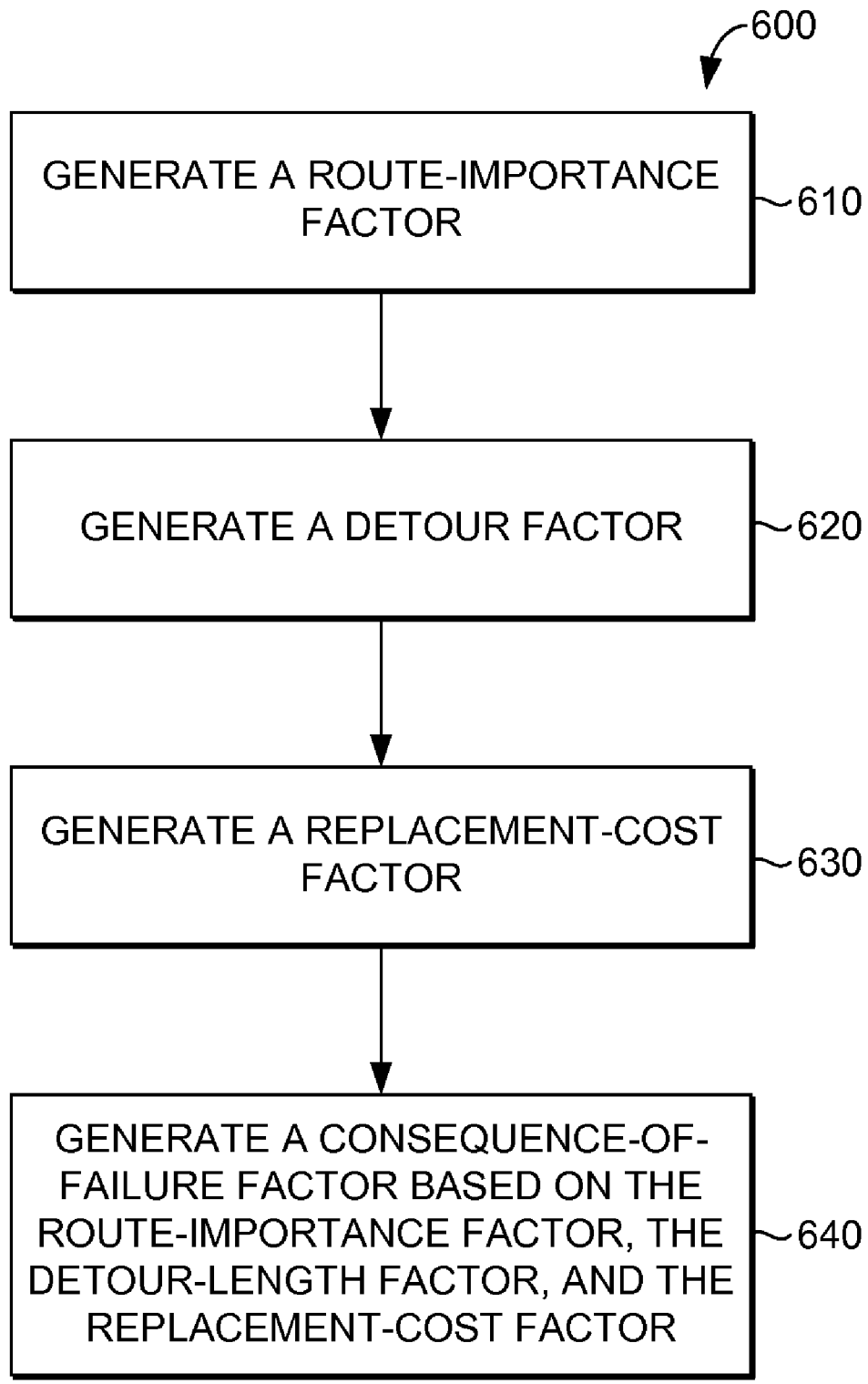
FIG. 6 illustrates a method 600 of determining a consequence-of-failure factor for a bridge, in accordance with an embodiment of the present invention.

Turning now to FIG. 6, a method 600 of determining a consequence-of-failure factor for a bridge is shown, in accordance with an embodiment of the present invention. Initially data from the bridge-characteristics database may be used as part of the method. At step 610, a route-importance factor is generated for the bridge. The route-importance factor is an indication of how important the route is of which the bridge is a part. For example, a bridge on an interstate highway may be more important than a bridge on a lightly traveled county road. In general, routes classified as interstate, freeway, expressway, or principal arterial may be designated with a route-importance factor indicating the route is more important.

At step 620, a detour factor is generated. In one embodiment, the detour factor may correspond to the length of the detour in mind plus the amount of the average daily truck traffic. In one embodiment, the length of detour is capped at 6. In one embodiment, the detour factor is calculated as the log (AADT times the detour length).

At step 630, a replacement-cost factor is generated for the bridge. In one embodiment, the replacement-cost factor is based on the bridge area. Various replacement cost factors and associated bridge areas have been explained previously with reference to FIG. 2.

At step 640, the consequence-of-failure factor is calculated as 1 minus (a rating factor times the route-importance factor times) the detour-length factor plus a replacement-cost factor)). The consequence-of-failure factor may then be stored and/or used to calculate an overall risk factor for the bridge.

Figure 7:
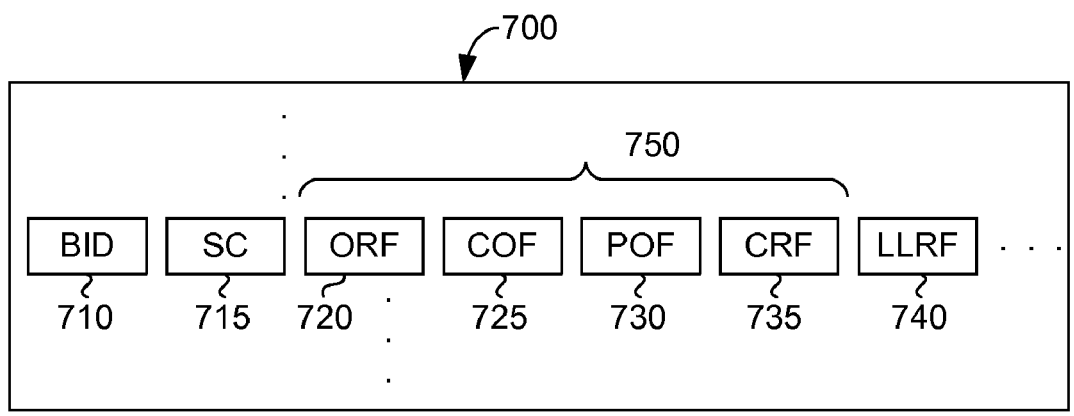
FIG. 7 is an illustration of a data structure suitable for storing information related to the bridge-risk factor, in accordance with an embodiment of the present invention.

Turning now to FIG. 7, a data structure showing characteristics of a bridge, including the risk-related factors, is shown in accordance to the embodiment of the present invention. Data structure 700 includes bridge ID 710, spatial coordinates 715, risk factor 720, consequence-of-failure factor 725, probability-of-failure factor 730, live-load-risk factor 740, and traffic-adjustment factor 735. All the shown data is related to the bridge associated with the bridge identification number 710. The bridge identification number may be taken from the NBI database. In one embodiment, the bridge identification number is found in both the bridge-characteristic database and the bridge-condition database and is used to correlate the data related to the bridge.

The spatial coordinates 715 for the bridge may be used to locate the bridge on a map. As shown in FIG. 3, the spatial coordinates may be used to create a graphical user interface showing a map with icons representing the bridge. The spatial coordinates may be in GIS format. The risk associated factors 750 have been described previously and may be accessed through a graphical user interface shown in FIG. 3 or other programs that can access data in a database. The data structure 700 may be part of a relational database and include other fields related to bridge identification number 710 as well as data related to many other bridges evaluated or not evaluated for an overall risk factor.

Figure 8:
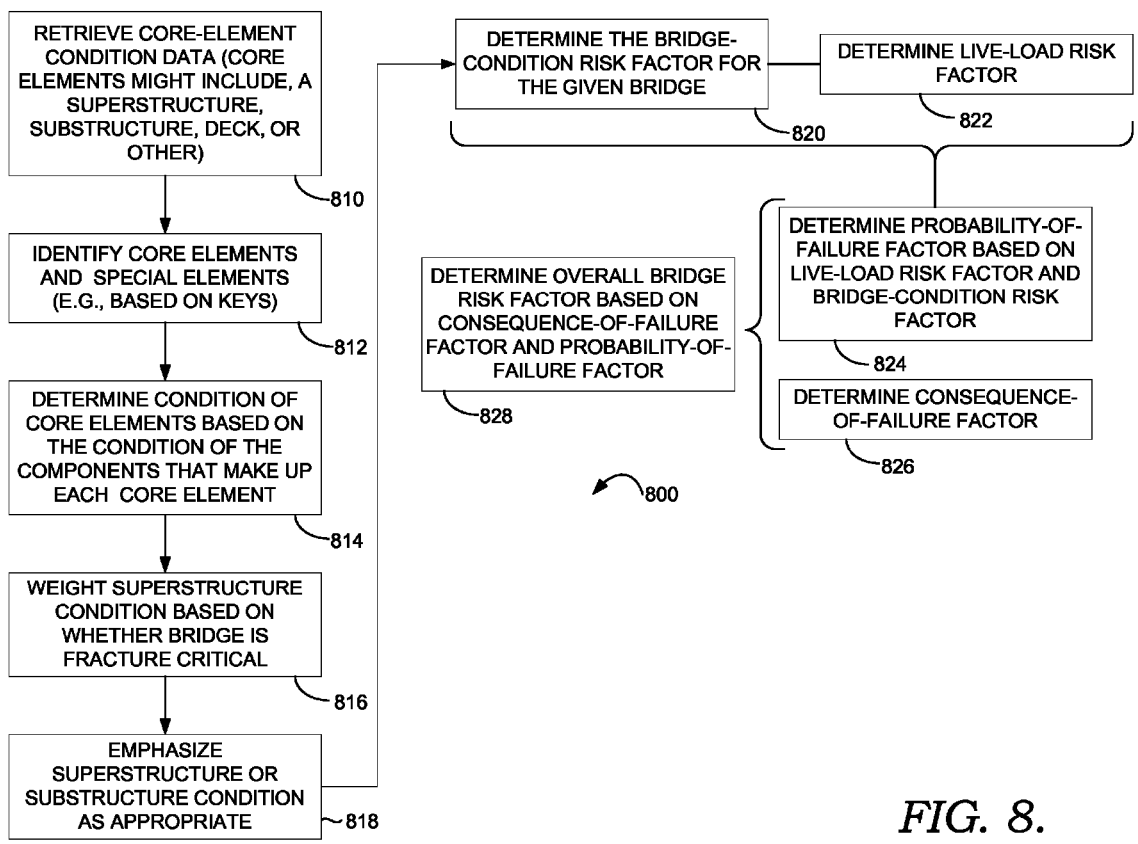
FIG. 8 shows an illustrative process for determining an overall risk factor for a bridge, in accordance with an embodiment of the present invention.
Figure 8A:
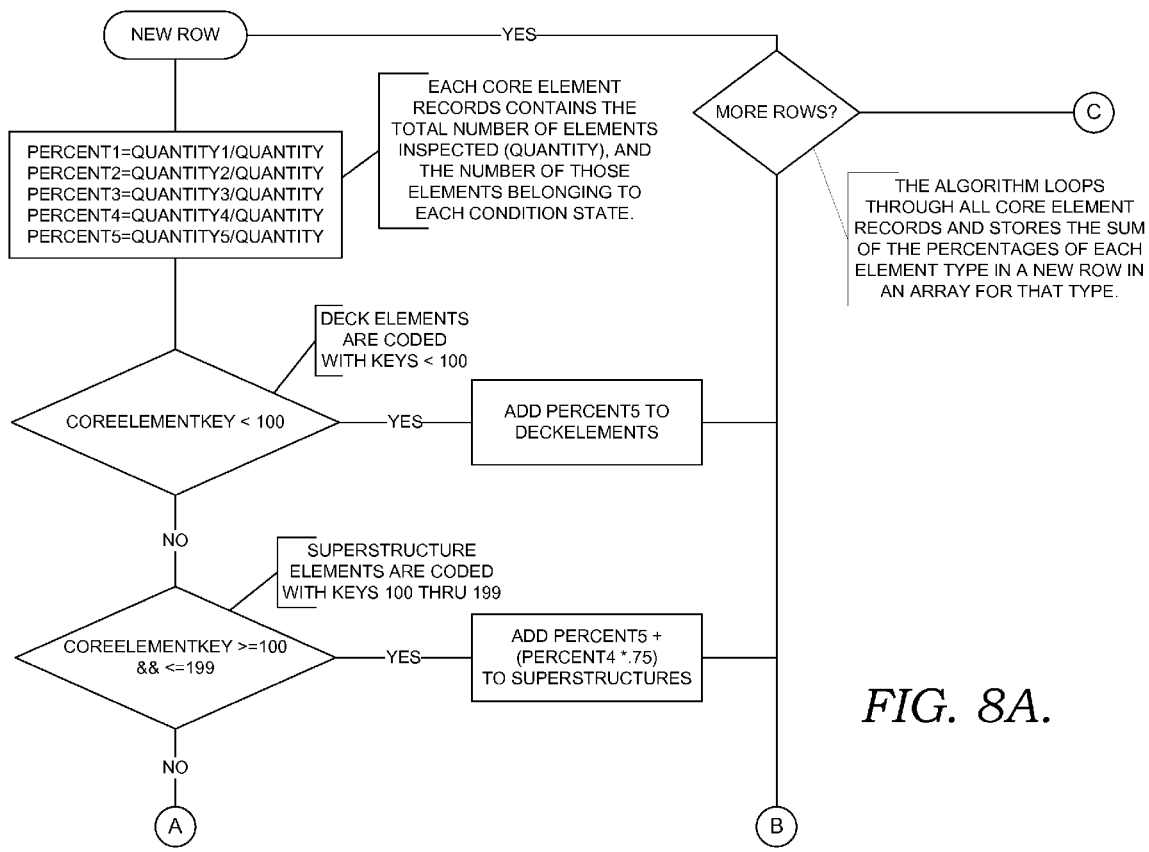
FIG. 8A-8L show a method of generating an overall risk factor for a bridge including numbers and factors used in one embodiment of the present invention.
Figure 8B:
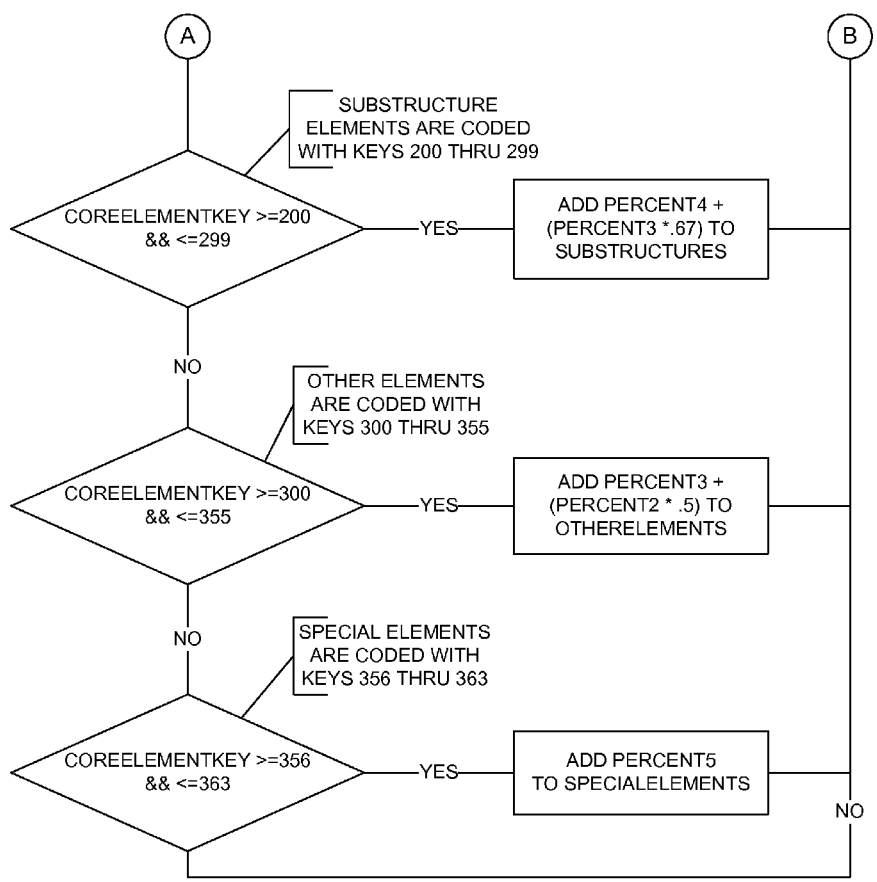
Figure 8C:
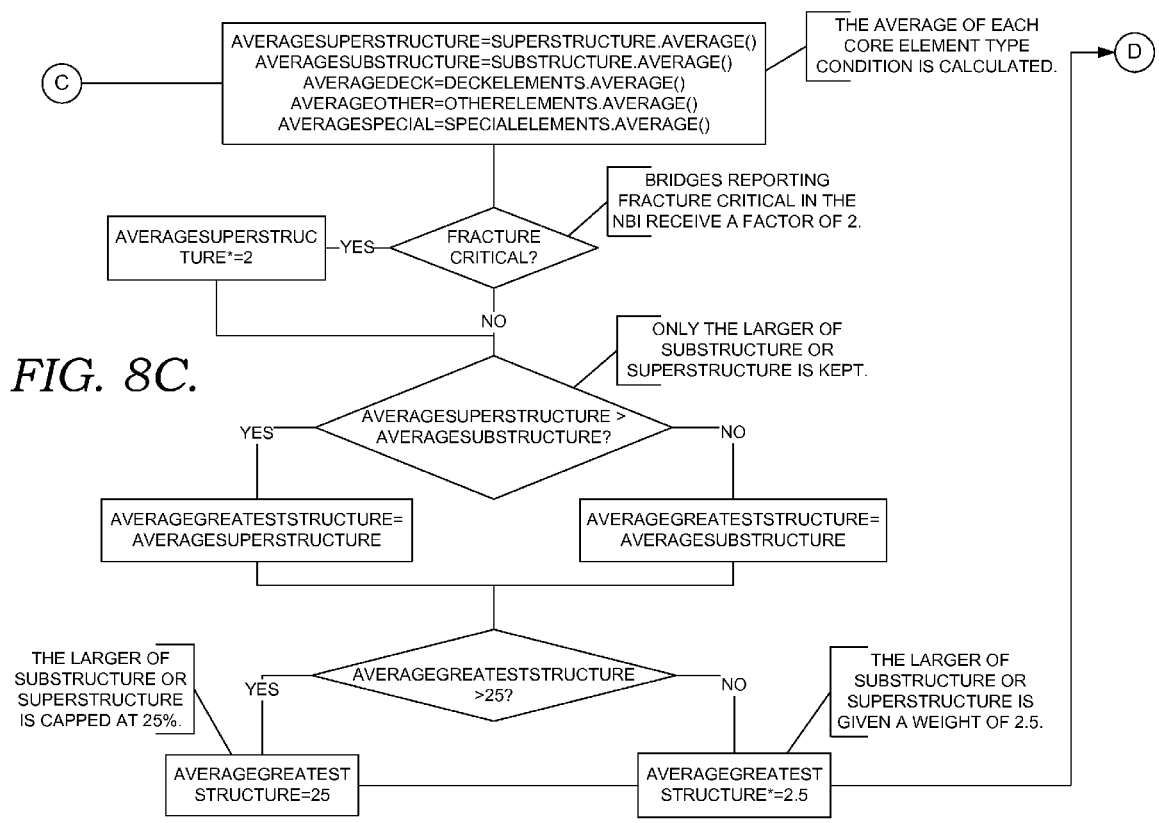
Figure 8D:
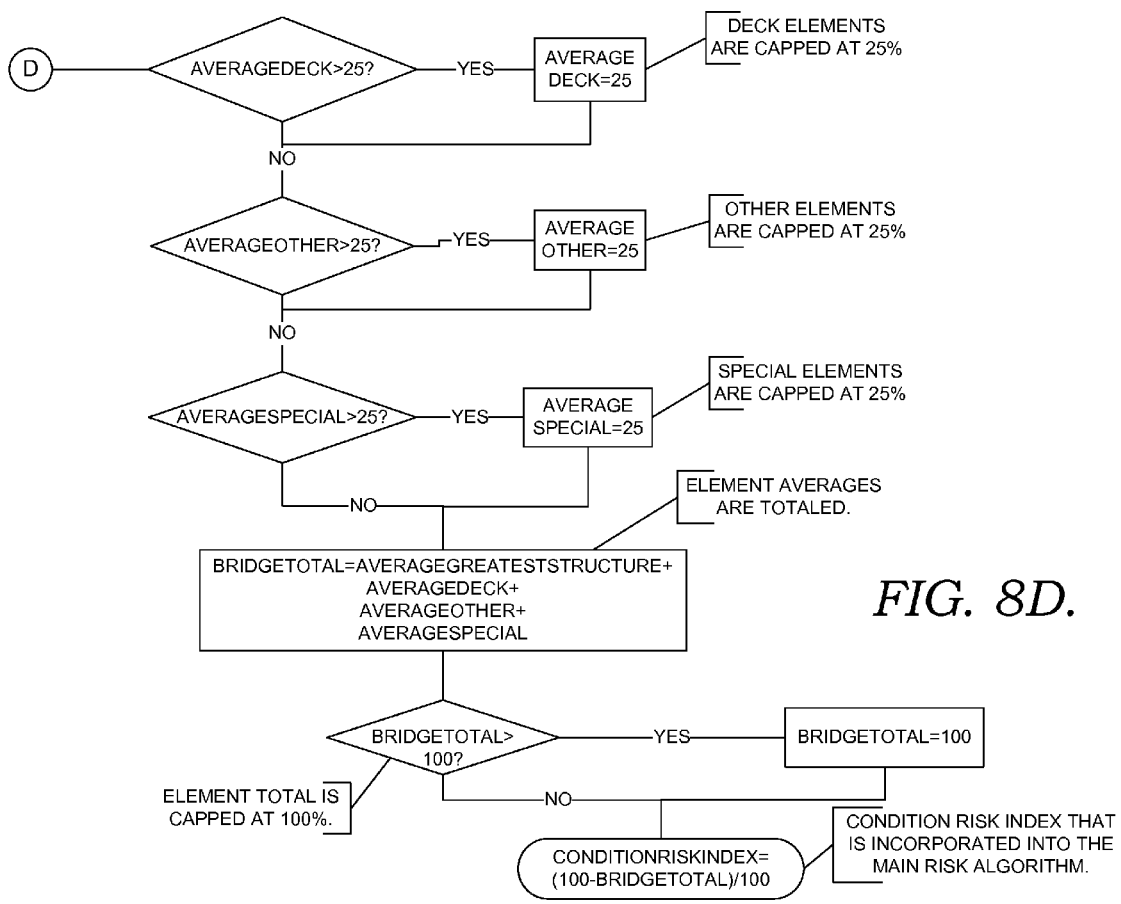
Figure 8E:
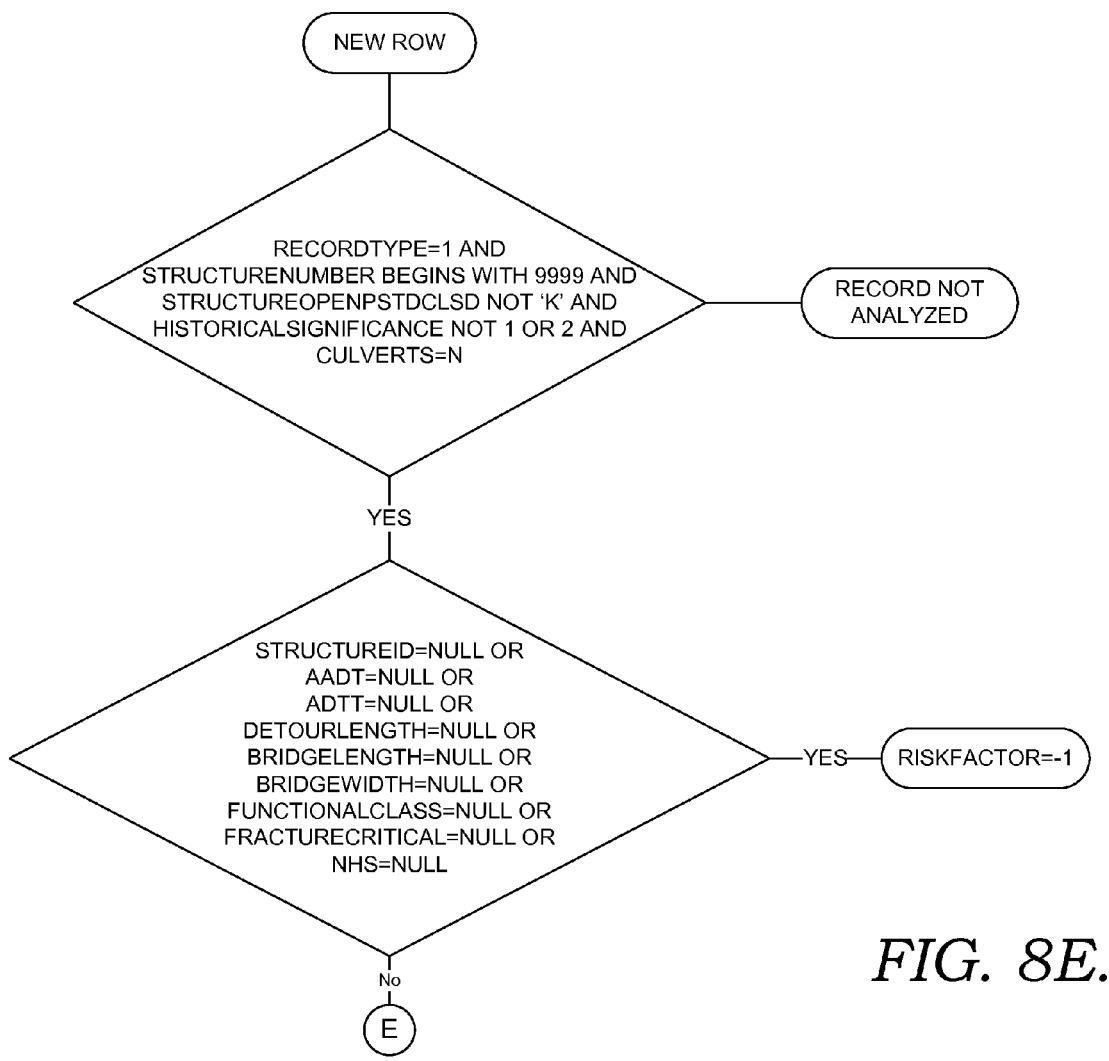
Figure 8F:
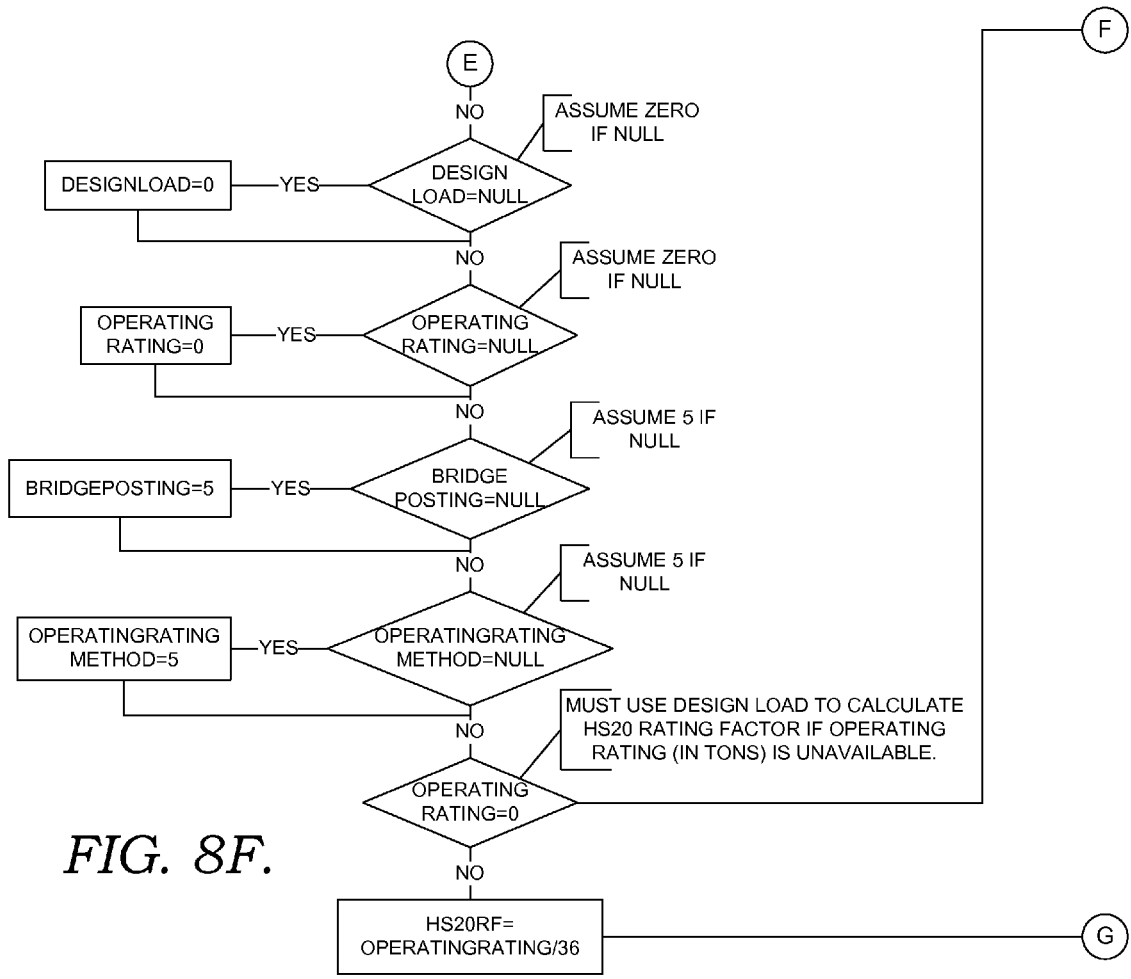
Figure 8G:
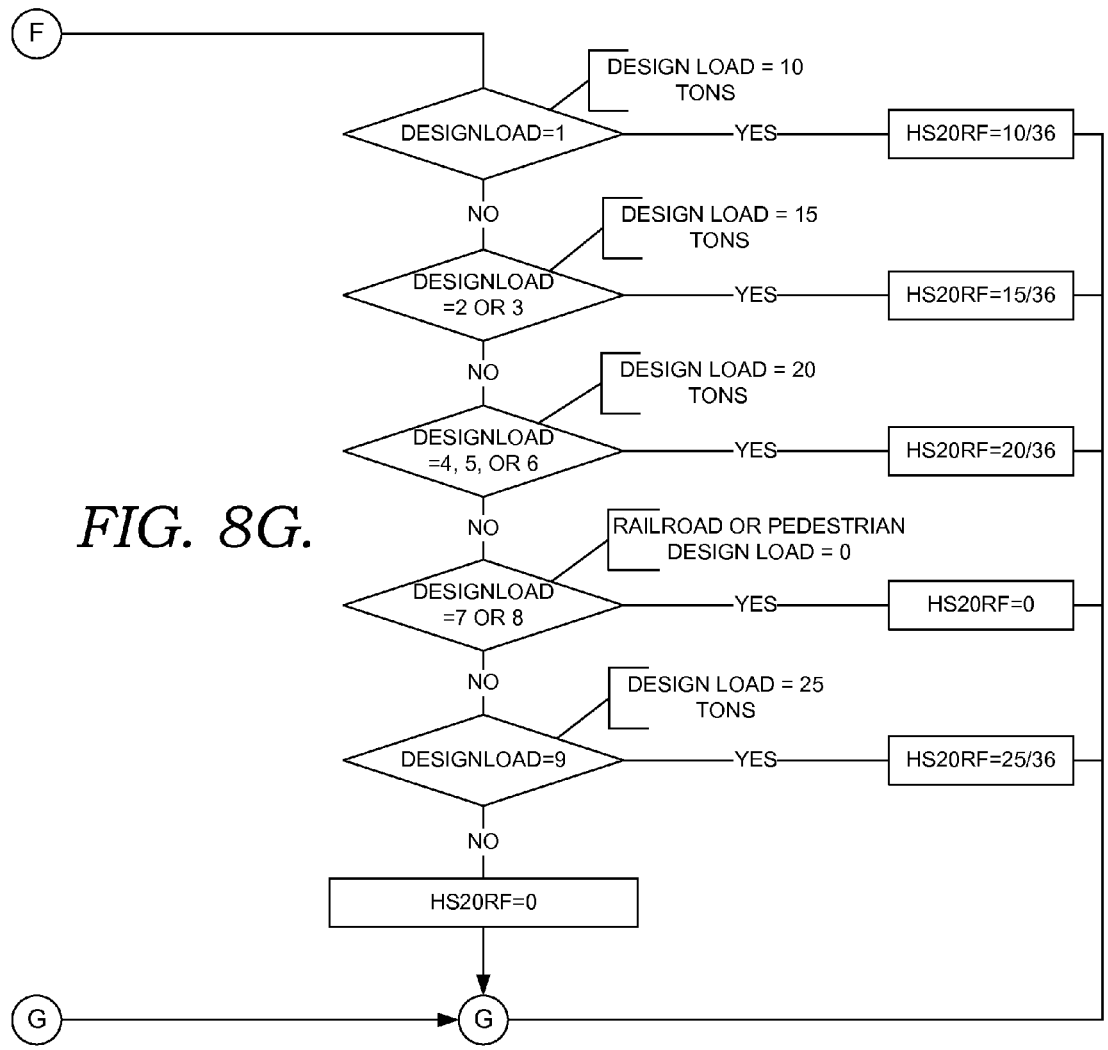
Figure 8H:
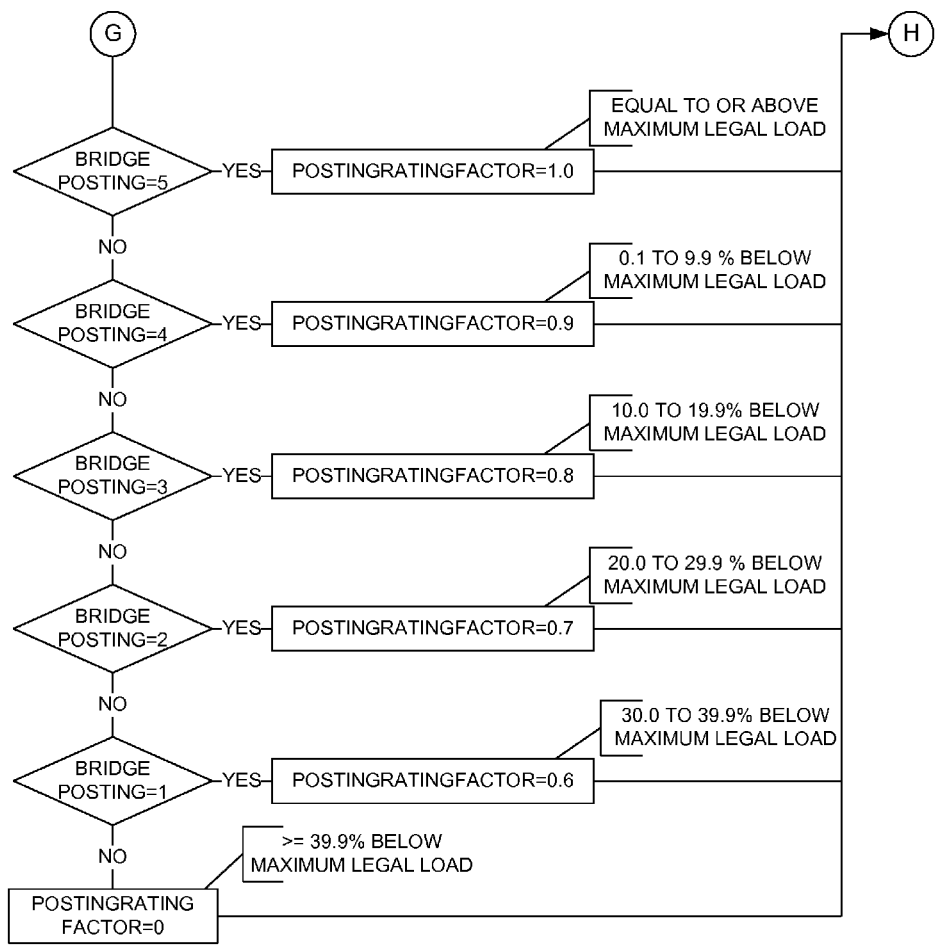
Figure 8I:
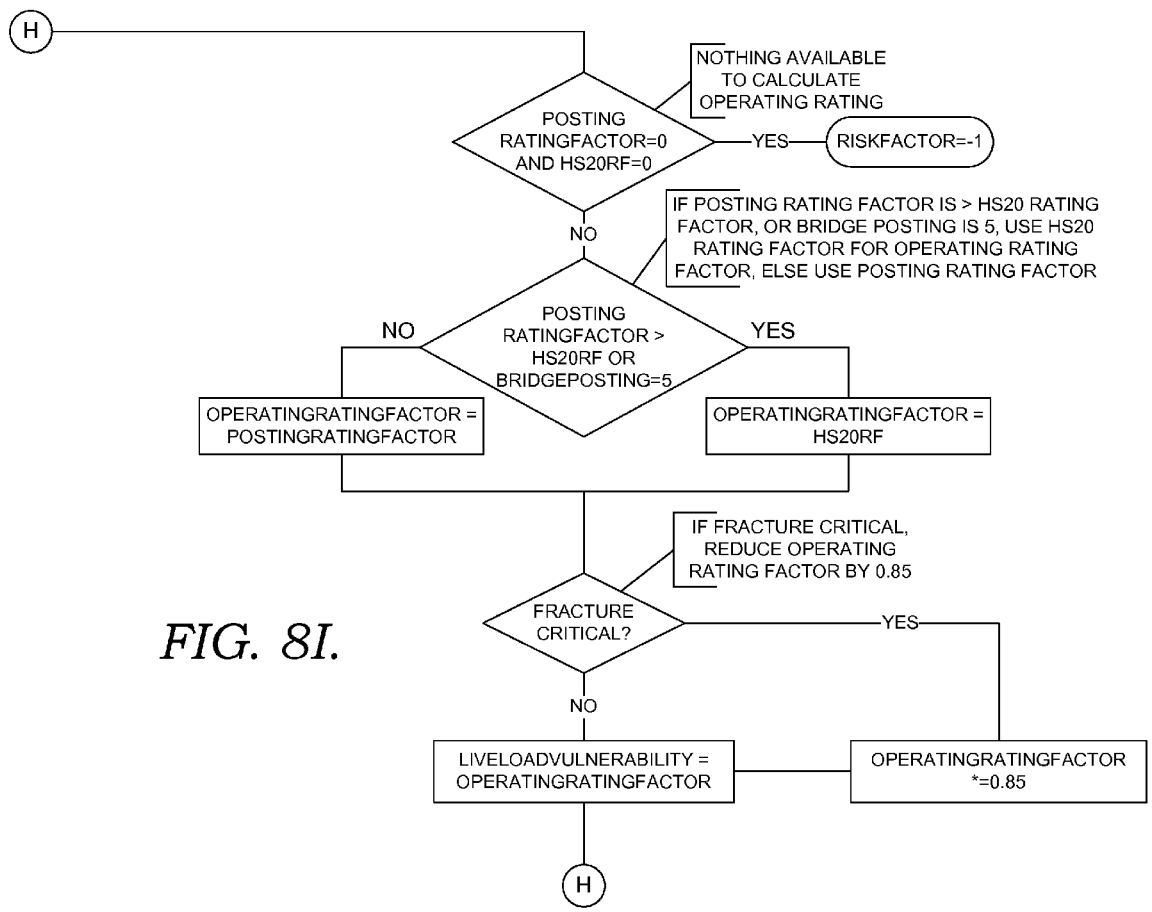
Figure 8J:
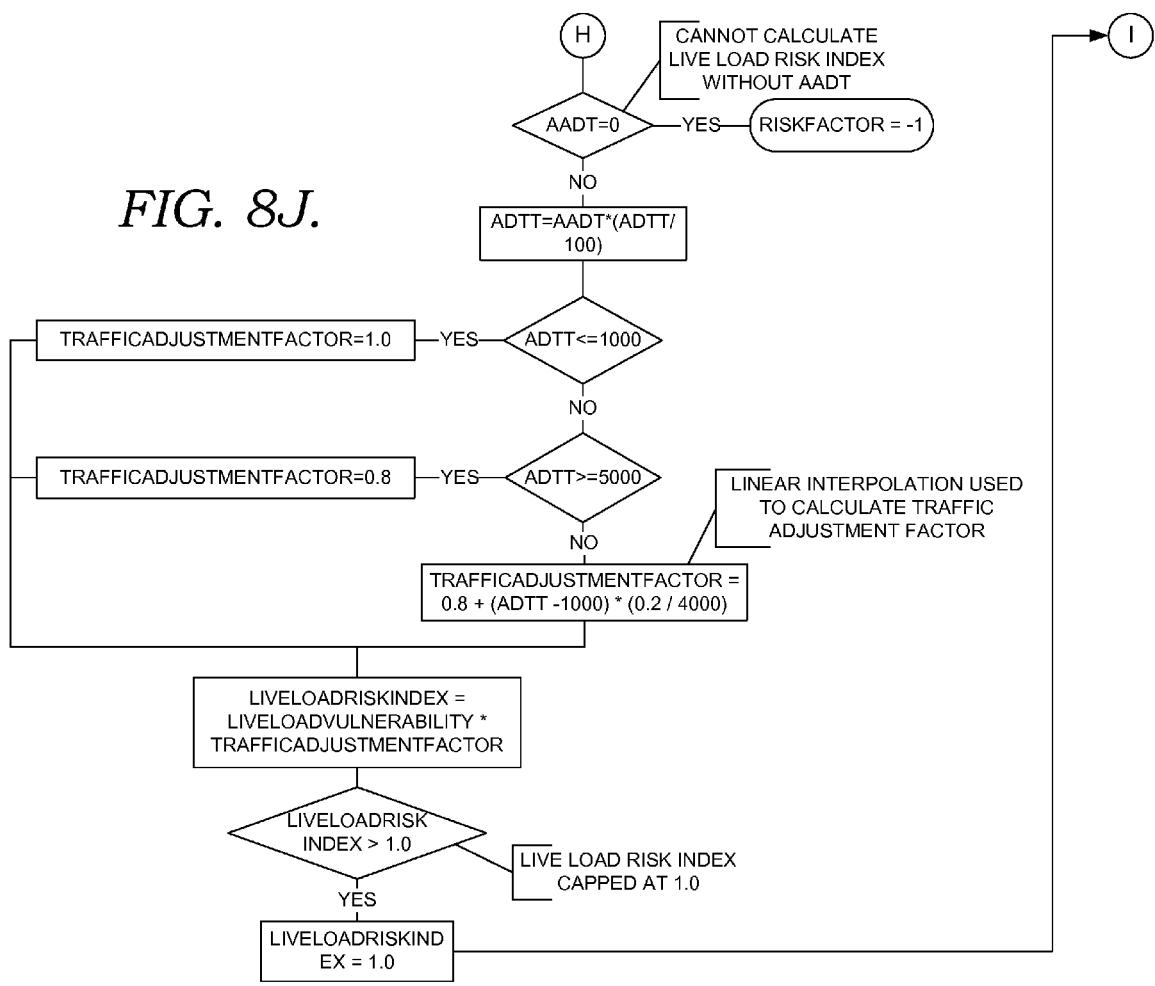
Figure 8K:
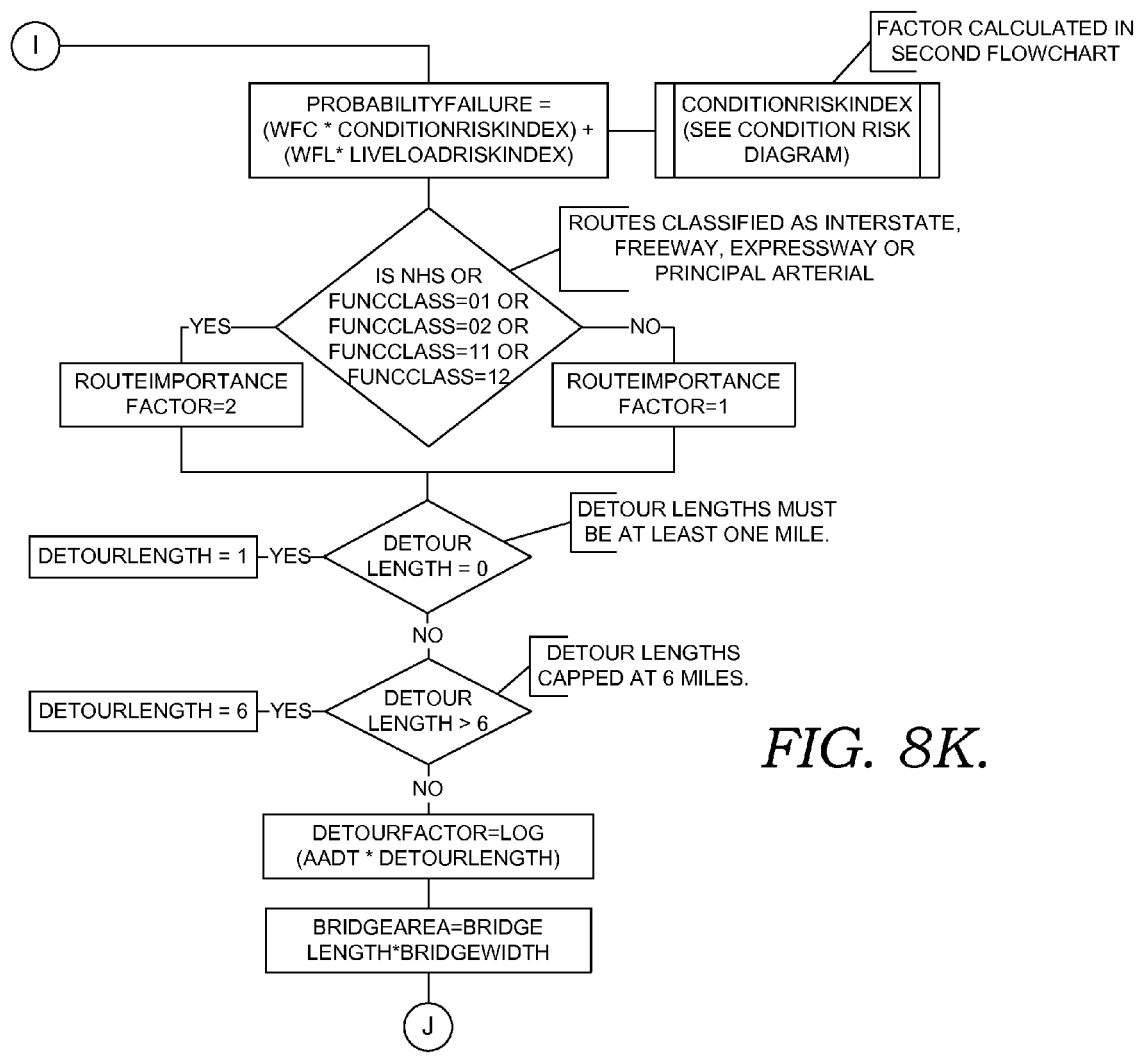
Figure 8L:
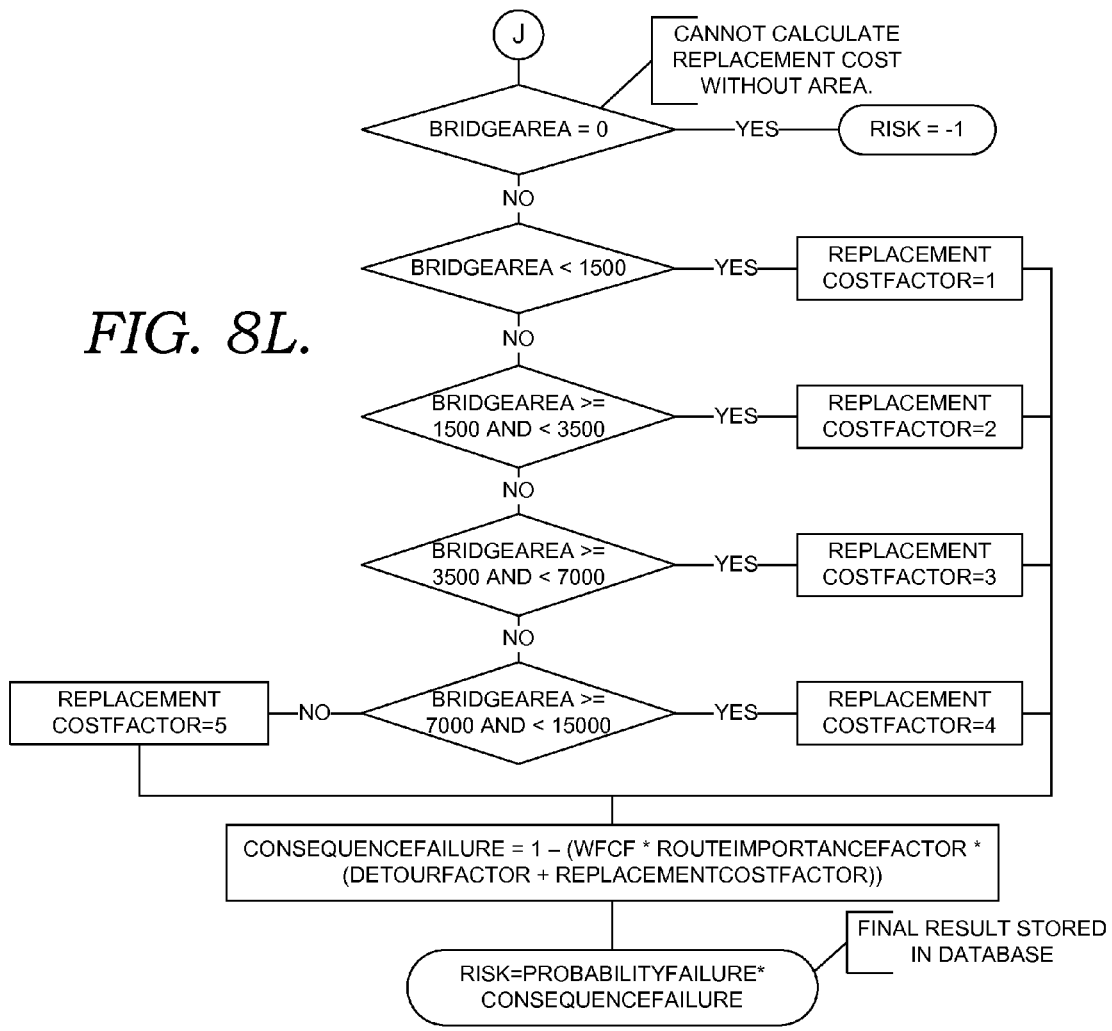

Turning now to FIG. 8, an illustrative process for determining an overall risk factor for a bridge is provided and referenced generally by number 800. At step 810, core-element-condition data is retrieved. Core elements include superstructure elements, substructure elements, deck elements, and other elements. Elements designated as special may also be retrieved. At step 812, core elements and special elements are identified within the core-element-condition data. At step 814, the condition of core element categories is determined based on the condition of components that make up each element category.

At step 816, the weight given to the superstructure element category within the bridge-condition risk factor determination is increased if the bridge is fracture critical. At step 818, either the superstructure or substructure category is weighted to increase the influence the superstructure or substructure category has on the calculation of the bridge-condition risk factor. At step 820, the bridge-condition risk factor is determined. At step 822, the live-load risk factor is determined. At step 824, the probability-of-failure factor is determined based on the bridge-condition risk factor and the live-load risk factor. At step 826, the consequence-of-failure factor is determined. At step 828, the overall bridge risk factor is determined based on the consequence-of-failure factor and the probability-of-failure factor. The risk factor calculations described in this application are based primarily on risks associated with bridge and traffic safety. The risk factor calculations may be extended to include risks to bridge serviceability and risks associated with extreme events such as floods, earthquakes, collision, fire, etc. Additional risk factors that may be used include traffic risk measures such as accident data, depending on the needs of particular bridge agencies. The overall bridge risk factor may include any risks to bridge and traffic safety and serviceability.

FIGS. 8A-8L depict an illustrative lower-level example of implementing the steps of FIG. 8. We provide details to meet statutory requirements, but they are not meant to be narrowing; rather, to illustrate an exemplary specific embodiment. NBI is used to illustrate the calculation of an overall risk factor for a plurality of bridges in the database.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable media having computer-executable instructions embodied thereon that, when executed, cause a computing device to perform a method of calculating a risk of not repairing a bridge, the method comprising:
    generating a live-load-risk factor for a bridge based on an overload probability and an operating rating;
    generating a bridge-condition risk factor for the bridge based on an average structural condition of bridge elements;
    generating a probability-of-failure factor for the bridge by combining the live-load-risk factor for the bridge with the bridge-condition risk factor for the bridge;
    generating a consequence-of-failure factor for the bridge;
    generating an overall risk factor for the bridge that is a product of multiplying the consequence-of-failure factor for the bridge and the probability-of-failure factor for the bridge; and
    storing the overall risk factor for the bridge in a data store.

2. The media of claim 1, wherein the overload probability is based on an average daily truck traffic carried by the bridge, wherein the operating rating is one or more of an entry retrieved from a database describing bridge characteristics, calculated based on a design load and based on a bridge posting.

3. The media of claim 1, wherein the bridge-condition risk factor is based on a weighted combination of bridge element conditions, wherein the greater of an average superstructure condition or an average substructure condition is given more weight than an average deck condition, an average special element condition, and an average other element condition.

4. The media of claim 1, wherein the probability-of-failure factor and the live-load-risk factor is combined by adding a first product of multiplying the probability-of-failure factor with a first weighting factor and a second product of multiplying the live-load-risk factor by a second weighting factor.

5. The media of claim 1, wherein the consequence-of-failure factor is based at least on an importance of a route of which the bridge is a part, a detour length required should the bridge be closed, and a replacement cost of the bridge.

6. Computer-readable media having computer-executable instructions embodied thereon that, when executed, cause a computing device to perform of method of determining a risk associated with not repairing a bridge, the method comprising:
    generating a live-load-risk factor for a bridge based on an overload probability and an operating rating, wherein the overload probability is based on an average daily truck traffic carried by the bridge, wherein the operating rating is one or more of an entry retrieved from a database describing bridge characteristics, calculated based on a design load, and based on a bridge posting;
    generating a bridge-condition risk factor for the bridge based on an average structural condition of bridge elements, wherein the bridge-condition risk factor is based on a weighted combination of bridge element conditions, wherein the greater of an average superstructure condition or an average substructure condition is given more weight than an average deck condition, an average special elements condition, and an average other element condition, and wherein the greater of the average superstructure condition and the average substructure condition is adjusted if the bridge is designated as fracture critical;
    generating a probability-of-failure factor for the bridge by combining the live-load-risk factor for the bridge with the bridge-condition risk factor for the bridge, wherein the probability-of-failure factor and the live-load-risk factor is combined by adding a first product of multiplying the probability-of-failure factor with a first weighting factor and a second product of multiplying the live-load-risk factor by a second weighting factor, and wherein the first weighting factor and the second weighting factor are equal to each other;
    generating a consequence-of-failure factor for the bridge based at least on an importance of a route of which the bridge is a part, a detour length required should the bridge be closed, and a replacement cost of the bridge;
    generating an overall risk factor for the bridge that is a product of multiplying the consequence-of-failure factor for the bridge and the probability-of-failure factor for the bridge; and
    storing the overall risk factor for the bridge in a data store.

7. The media of claim 6, wherein the method further comprises:
    receiving bridge characteristics for the bridge from a bridge characteristics database; and
    receiving condition information for the bridge from a bridge-condition database, wherein the condition information describes a structural condition of bridge elements.

8. The media of claim 6, wherein the method further comprises:
    receiving a request from a presentation component for the overall risk factor; and
    communicating the overall risk factor to the presentation component along with spatial coordinates that allow the bridge to be located on a map.

9. The media of claim 6, wherein generating the bridge-condition risk factor further comprises:
    generating the average superstructure condition by averaging a condition score for each superstructure element of the bridge;
    generating the average substructure condition by averaging a condition score for each substructure element of the bridge;
    generating the average deck condition by averaging a condition score for each deck element of the bridge;
    generating the average other-element condition for other elements in the bridge by averaging a condition score for each of the other elements;
    generating an average special-element condition by averaging a condition score for each special element of the bridge; and
    adding the average special-element condition, the average other element condition, and the average deck condition with the larger of the average superstructure condition and the average substructure condition to arrive at the bridge-condition risk factor for the bridge.

10. The media of claim 6, wherein generating the live-load-risk factor further comprises:

multiplying the operating-rating by a fracture-critical factor if the bridge is designated as fracture critical.

11. The media of claim 6, wherein the method further comprises calculating risk factors for each of a plurality of bridges in a group of bridges.

12. The media of claim 6, wherein the bridge-condition risk factor is based on the average superstructure condition, the average substructure condition, and the average deck condition.

13. Computer-readable media having computer-executable instructions embodied thereon that, when executed, cause a computing device to perform a method of determining a bridge-condition risk factor for a bridge, the method comprising:
   generating an average superstructure condition by averaging a condition score for each superstructure element of the bridge;
   generating an average substructure condition by averaging a condition score for each substructure element of the bridge;
   generating an average deck condition by averaging a condition score for each deck element of the bridge;
   generating an average other element condition for other elements by averaging a condition score for each other element in the bridge;
   generating an average special-element condition by averaging a condition score for each special element of the bridge; and
   adding the average special-element condition, the average other element condition, the average deck condition with the larger of the average superstructure condition and the average substructure condition to arrive at the bridge-condition risk factor for the bridge.

14. The media of claim 13, wherein the method further comprises capping the average special-element condition, the average other element condition, the average deck condition, the average superstructure condition, and the average substructure condition to arrive at the bridge-condition risk factor for the bridge at a threshold value.

15. The media of claim 14, wherein the method further comprises multiplying the larger of the average superstructure condition and the average substructure condition by a weighting factor to increase an importance of either the average superstructure condition or the average substructure condition to the bridge-condition risk factor.

16. The media of claim 13, wherein the method further comprises determining that the bridge is fracture critical.

17. The media of claim 16, wherein the method further comprises multiplying the larger of the average superstructure condition and the average substructure condition to arrive at the bridge-condition risk factor for the bridge by a fracture-critical multiplier.

18. The media of claim 13, wherein the method further comprises
   generating a live-load-risk factor for a bridge based on an overload probability and an operating rating; and
   generating a probability-of-failure factor for the bridge by combining the live-load-risk factor for the bridge with the bridge-condition risk factor for the bridge.

19. The media of claim 18, wherein the method further comprises:
   generating a consequence-of-failure factor for the bridge;
   generating an overall risk factor for the bridge that is a product of multiplying the consequence-of-failure factor for the bridge and the probability-of-failure factor for the bridge; and
   storing the overall risk factor for the bridge in a data store.

20. The media of claim 19, wherein the method further comprises:
   displaying a subset of bridges with an overall risk factor above a risk-threshold on a map.

* * * * *